(12) United States Patent
Azizi

(10) Patent No.: US 12,437,663 B2
(45) Date of Patent: Oct. 7, 2025

(54) INTERACTIVE LEARNING AND ANALYTICS PLATFORM

(71) Applicant: Uflo 1 Inc., San Diego, CA (US)

(72) Inventor: Sina Azizi, San Diego, CA (US)

(73) Assignee: Uflo 1 Inc., San Diego, CA (US)

( * ) Notice: Subject to any disclaimer, the term of this patent is extended or adjusted under 35 U.S.C. 154(b) by 0 days.

(21) Appl. No.: 18/896,547

(22) Filed: Sep. 25, 2024

(65) Prior Publication Data
US 2025/0131847 A1    Apr. 24, 2025

Related U.S. Application Data

(63) Continuation of application No. 17/588,153, filed on Jan. 28, 2022, now abandoned.

(60) Provisional application No. 63/142,897, filed on Jan. 28, 2021.

(51) Int. Cl.
G09B 7/04 (2006.01)
G09B 7/08 (2006.01)

(52) U.S. Cl.
CPC .................. *G09B 7/04* (2013.01); *G09B 7/08* (2013.01)

(58) Field of Classification Search
CPC ... G09B 7/04; G09B 7/08; G09B 5/02; G09B 5/06
See application file for complete search history.

(56) References Cited

U.S. PATENT DOCUMENTS

| | | | | |
|---|---|---|---|---|
| 6,856,318 B1 * | 2/2005 | Lewak | ............... | G09B 23/02 434/188 |
| 9,715,901 B1 * | 7/2017 | Singh | ............... | H04N 21/8547 |
| 2002/0031756 A1 | 3/2002 | Holtz et al. | | |
| 2003/0064354 A1 | 4/2003 | Lewis | | |
| 2004/0002049 A1 * | 1/2004 | Beavers | ............... | G09B 7/00 434/350 |
| 2013/0004930 A1 | 1/2013 | Sorenson et al. | | |
| 2013/0191776 A1 * | 7/2013 | Harris | ............... | H04M 1/72445 715/784 |
| 2013/0204942 A1 | 8/2013 | Agarwal | | |
| 2013/0224718 A1 | 8/2013 | Woodward | | |
| 2015/0269854 A1 | 9/2015 | Maharaj et al. | | |
| 2016/0364115 A1 | 12/2016 | Joung | | |
| 2019/0114937 A1 | 4/2019 | Capps et al. | | |

(Continued)

OTHER PUBLICATIONS

Office Action for U.S. Appl. No. 17/588,153, mailed on Mar. 27, 2024, Azizi, "Interactive Learning and Analytics Platform", 25 pages.

(Continued)

*Primary Examiner* — Kang Hu
*Assistant Examiner* — Correll T French
(74) *Attorney, Agent, or Firm* — Lee & Hayes, P.C.

(57) ABSTRACT

Systems and methods, and non-transitory computer-readable medium storing instructions that, when executed, causes a processor to perform operations, including displaying a storyboard via a user output device. The story board may include a plurality of frames. The frames may include an illustration. The illustration may include a first state and a second state. The operations may further include changing the illustration within the frame from the first state to the second state based on a scroll command from a user input device from a first frame to a second frame of the plurality of frames.

20 Claims, 47 Drawing Sheets

Frame

Visualization

(56) References Cited

U.S. PATENT DOCUMENTS

2022/0238032 A1    7/2022   Azizi

OTHER PUBLICATIONS

Office Action for U.S. Appl. No. 17/588,153, mailed on Jan. 3, 2023, Azizi, "Interactive Learning and Analytics Platform", 29 pages.
Office Action for U.S. Appl. No. 17/588,153, mailed on Aug. 23, 2023, Azizi, "Interactive Learning and Analytics Platform", 26 pages.

\* cited by examiner

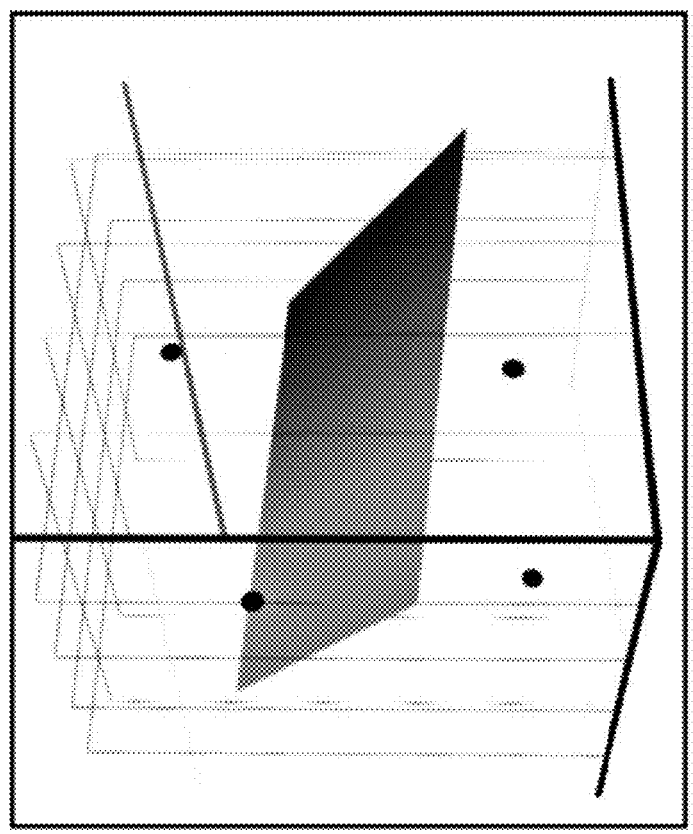
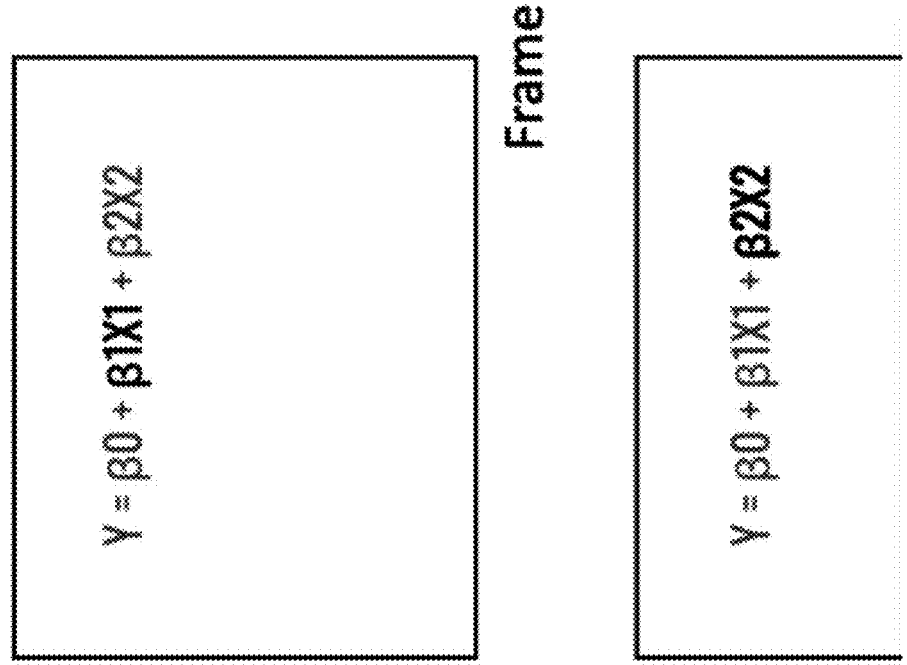
FIG. 1

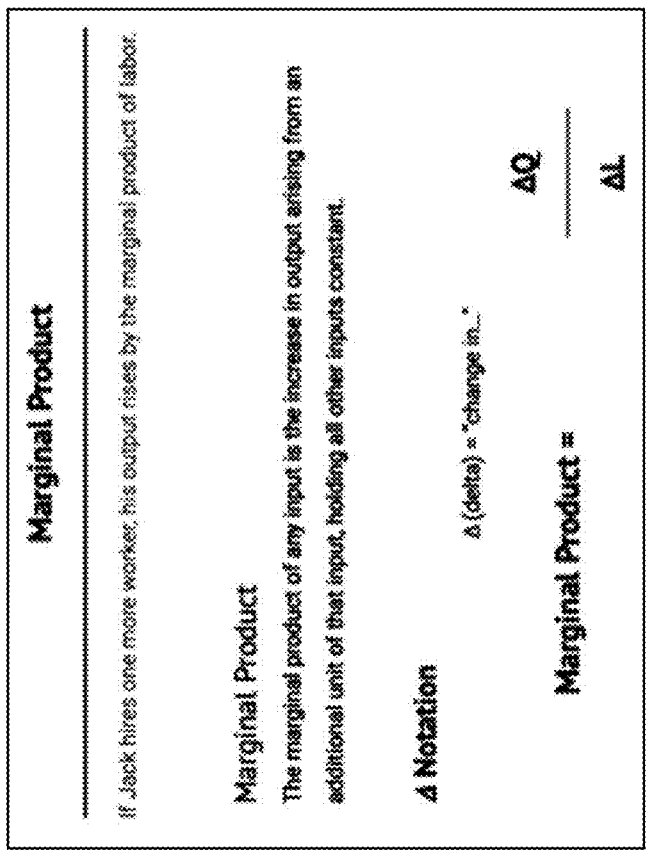
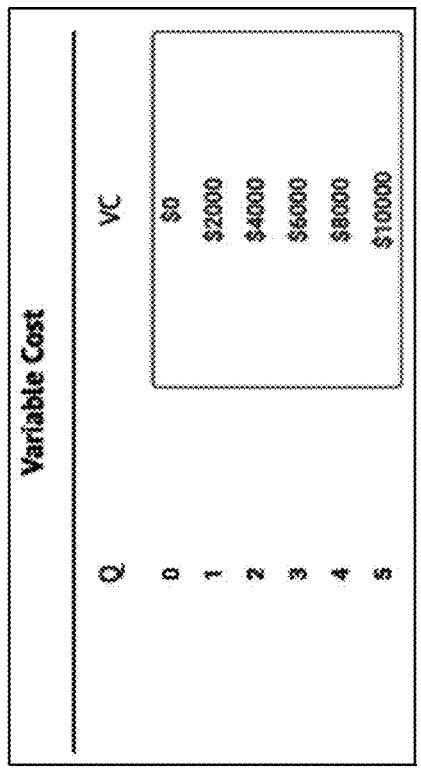
FIG. 2

MPL diminishing marginal return

If we plot the slope for each labor quantity, you can see it is decreasing at a constant rate.

| ΔL | Labor | Quantity | ΔQ |
|----|-------|----------|-----|
|    | 0     | 0        |     |
| 1  | 1     | 1000     | 1000 |
| 1  | 2     | 1800     | 800 |
| 1  | 3     | 2400     | 600 |
| 1  | 4     | 2800     | 400 |
| 1  | 5     | 3000     | 200 |

As a result, Farmer Jack's output rises by a smaller and smaller amount for each additional worker. Why?

Question!!!

Let's practice finding y. Let's say we have a line with the slope of 2, and intercept of 4. At which x-value, will y equal to 10.

Fully Exit
viewTop > frameBottom

In view when
viewTop < frameTop
&&
viewBottom > frameBottom

About to Enter
viewBottom > frameTop

We call each of these scenarios a state. Activation of each state affects the attributes of a component.

FIG. 21

Fully Exit
viewTop > frameBottom

In view when
viewTop < frameTop
&&
viewBottom > frameBottom

About to Enter
viewBottom > frameTop

What if two states are true
at the same time?
Would that cause problems?

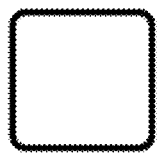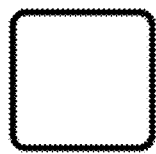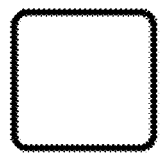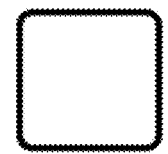
Frames
FIG. 30

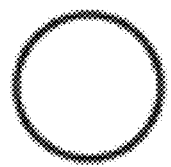
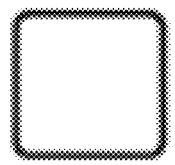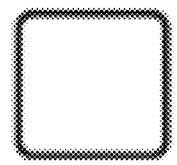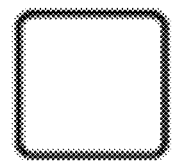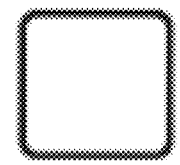
FIG. 31

FIG. 33 Lecture/ Lesson

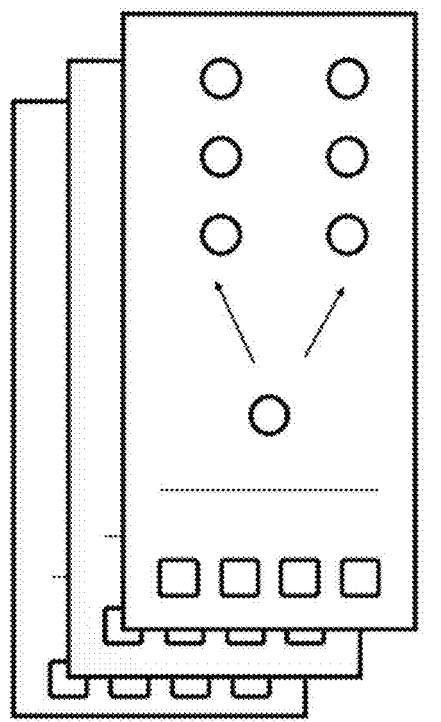
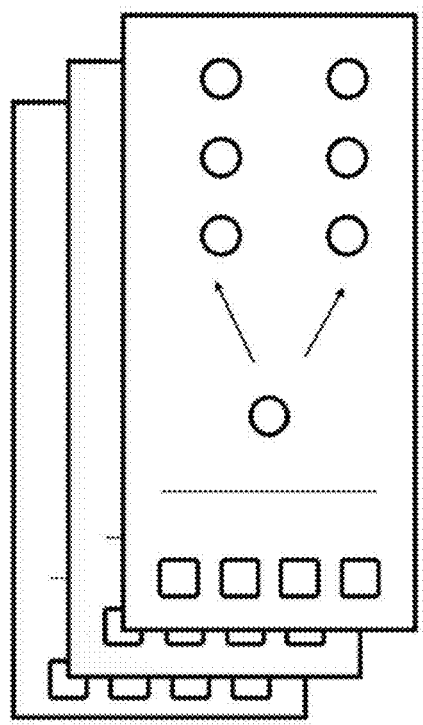
FIG. 34

Learning Objective Support

It appears as though you are having trouble with "p-Values". Is this the case, or do you have an issue with another topic?

Effort Support

It appears as though you are not Participating much in the class. Is there anything we can do to help?

Professor Suggestions

Performance Suggestion

If you put in 5 more hours this week your score could improve from B- to B+.

Effort Suggestion

Try to study 2 hours at a time without Distraction to maximize your learning capabilities.

Student Suggestions

FIG. 40

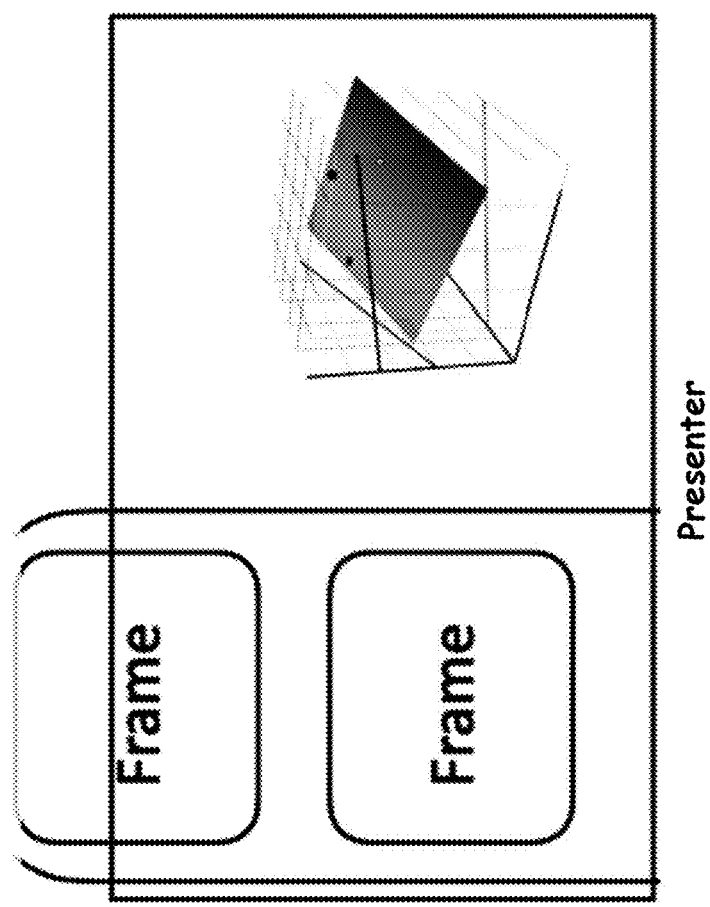
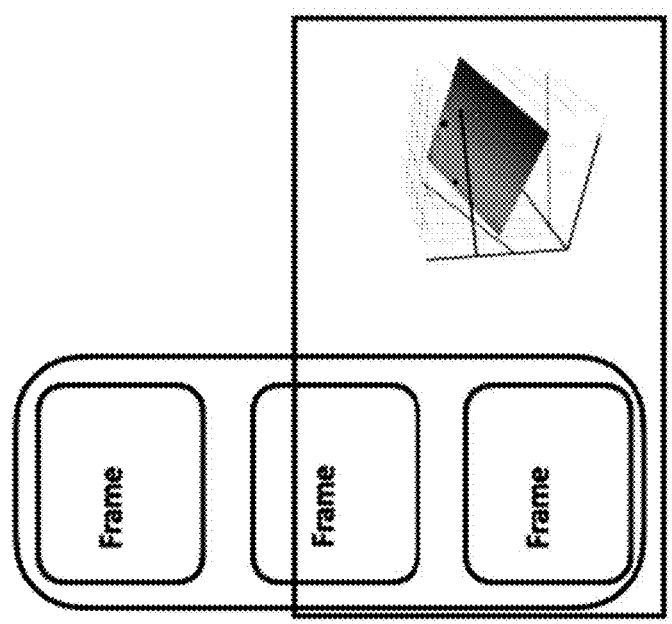
FIG. 44

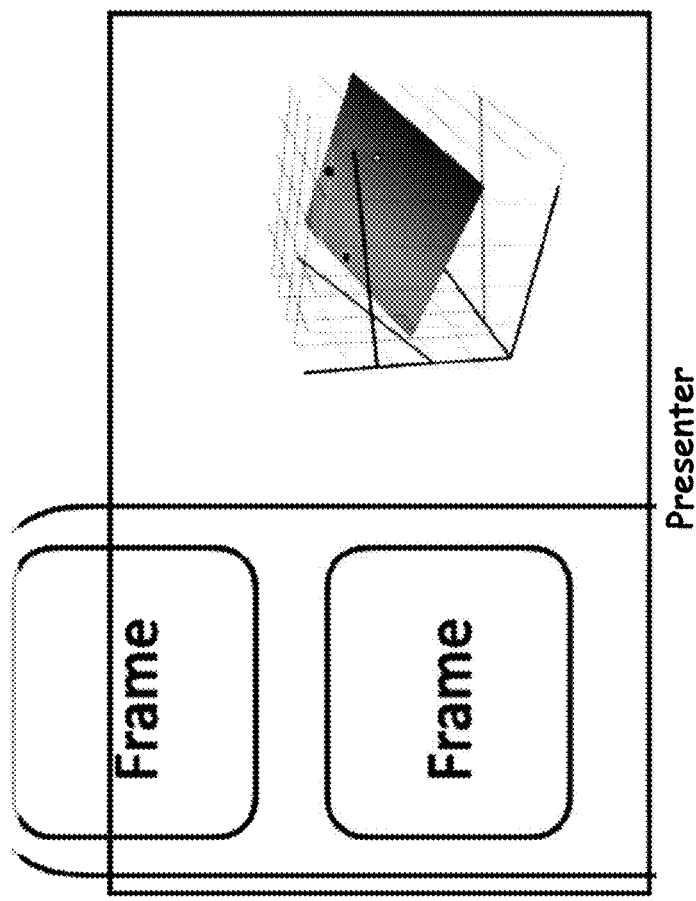
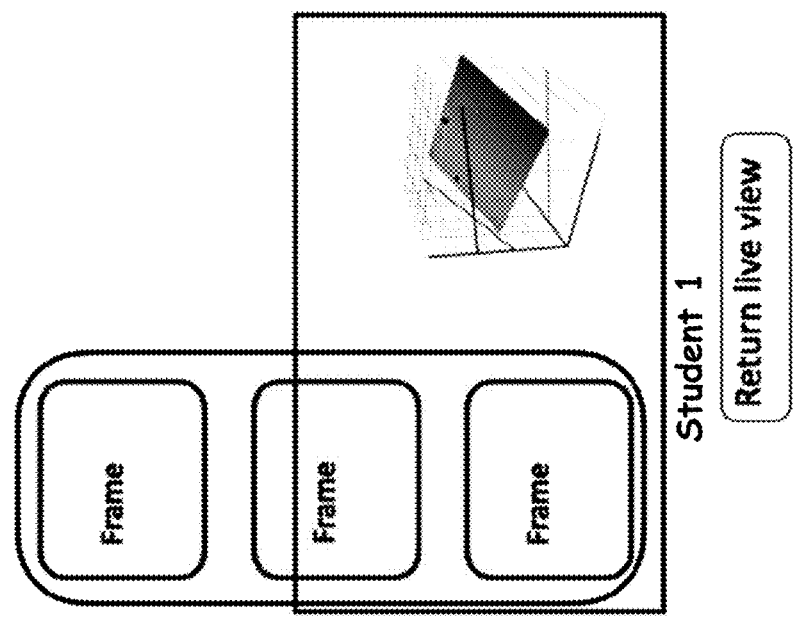
FIG. 45

INTERACTIVE LEARNING AND ANALYTICS PLATFORM

RELATED APPLICATIONS

This application claims the benefit of U.S. Non-Provisional application Ser. No. 17/588,153, filed Jan. 28, 2022, which claims benefit of U.S. Provisional Application No. 63/142,897, filed Jan. 28, 2021, which is incorporated herein by reference in its entirety. Further, this application is related to U.S. Design patent application Ser. No. 29/768,319 (U031-0002US), filed on Jan. 28, 2021, the disclosure of which is incorporated by reference herein.

TECHNICAL FIELD

The present disclosure relates generally to systems and methods for providing an educational platform. Specifically, the present disclosure relates to systems and methods for providing an interactive educational platform that improves teaching and immersive learning through a highly interactive and analytics education platform.

BACKGROUND

Providing education to individuals of all ages is ubiquitous throughout the world. Educators often rely on textbooks, visual presentations, interactive (e.g., hands on) learning, and computer-drive educational tools to assist in teaching and learning. However, many of these educational tools lack the ability for students and educators the ability to share ideas and progress through a curriculum in a timely manner while still providing immersive interaction between students and educators.

Further, in many instances, students are unable to discuss topics or learning objectives with an educator (e.g., a teacher or professor) since the presentation of information by the educator may continue without the educator knowing that a student needs to have a question answered or clarification provided. Still further, in online learning situations where the information is being presented over a computer network, students may not be able to communicate in a meaningful way during presentation of the topic or learning objectives.

Still further, in some instances, educators are unable to provide meaningful feedback on a student's performance in a timely manner. Often, students may desire to know how well they are understanding the topic or learning objectives and what may be done to improve in the course of study. Further, teachers and professors may similarly not realize how well their students are performing and understanding the topic and learning objectives and how the teachers and professors may assist an individual or group of students to improve. Because some topics and learning objectives build on one another through a course of learning, it may be difficult to identify where a student's understanding is lacking and when to intervene with additional clarification and learning.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates a storyboard presented on a user interface, according to an example of the principles described herein.

FIG. 2 illustrates an interactive frame that may be presented in the storyboard of FIG. 1, according to an example of the principles described herein.

FIG. 3 illustrates an interactive frame that may be presented in the storyboard of FIG. 1, according to an example of the principles described herein.

FIG. 21 illustrates a number of frames positioned within and without the viewport, according to an example of the principles described herein.

FIG. 22 illustrates a number of frames positioned within and without the viewport, according to an example of the principles described herein.

FIG. 28 illustrates an interactive instance, according to an example of the principles described herein.

FIG. 30 illustrates a presentation creation instance, according to an example of the principles described herein.

FIG. 31 illustrates a presentation creation instance, according to an example of the principles described herein.

FIG. 34 illustrates a presentation creation instance, according to an example of the principles described herein.

FIG. 40 illustrates performance and effort suggestions, according to an example of the principles described herein.

FIG. 44 illustrates synchronized viewports, according to an example of the principles described herein.

FIG. 45 illustrates synchronized viewports, according to an example of the principles described herein.

DESCRIPTION OF EXAMPLE EMBODIMENTS

Overview

Figure 4:
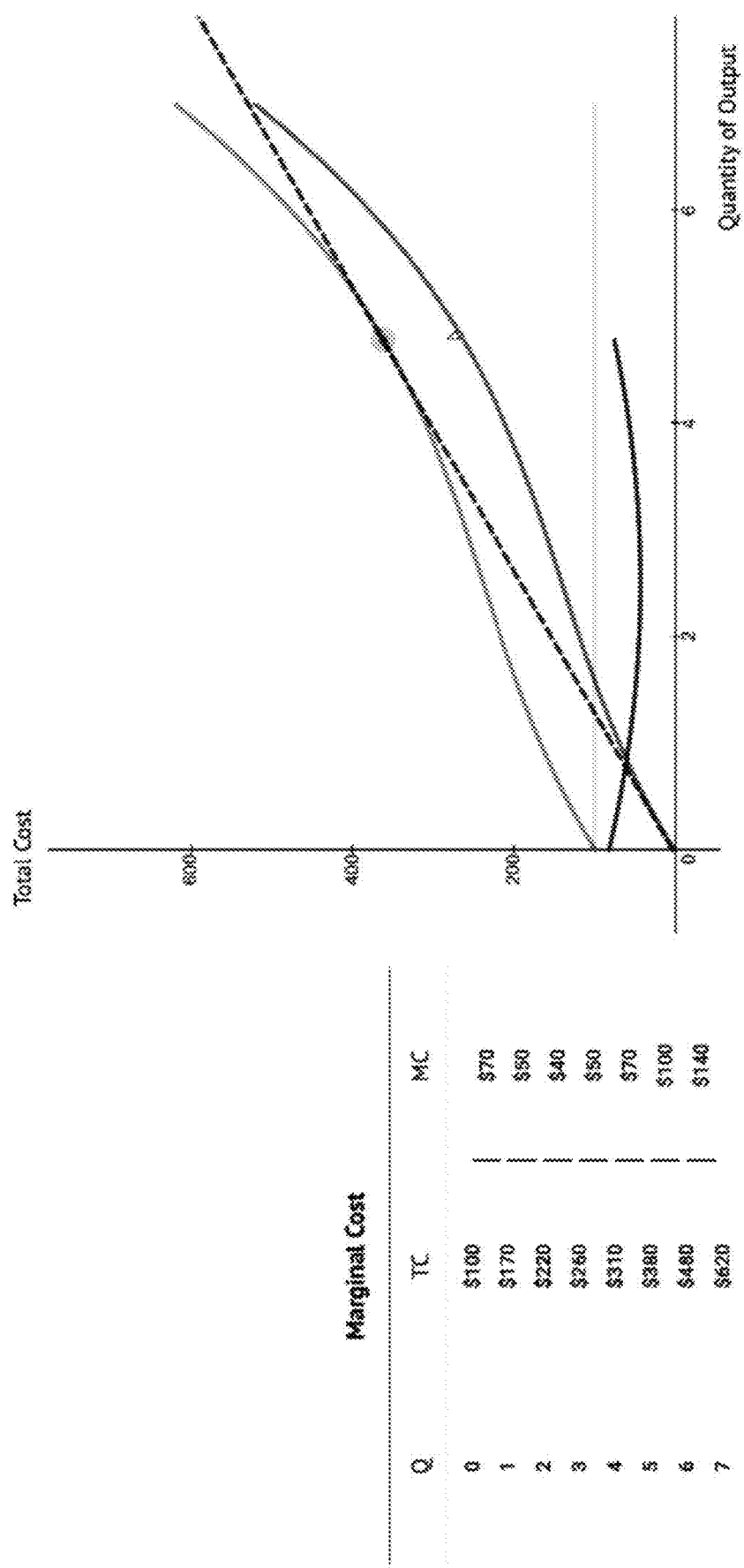
FIG. 4 illustrates a visualization including a table and a chart, according to an example of the principles described herein.

The present systems and methods provide interaction of text and visuals during a learning instance by allowing a student and/or educator to scroll through a presentation that includes one or more learning topics and allow for an immersive interaction between the student and the educator. Further, the manner in which the learning interactions occur may be identified, stored, and analyzed in order to provide the student and/or the educator with knowledge as to how well the information presented as the learning objective is being received and understood. These analytics may assist a student by allowing the student to identify concepts that may have not been fully understood as well as concepts that are understood. Further, these analytics may assist the educator in identifying a level of understanding of the curriculum as a whole and/or individual concepts within the curriculum for an individual student and/or a plurality of students (e.g., a classroom of students).

Examples described herein provide a non-transitory computer-readable medium storing instructions that, when executed, causes a processor to perform operations, including displaying a storyboard via a user output device. The story board may include a plurality of frames. The frames may include an illustration. The illustration may include a first state and a second state. The operations may further include changing the illustration within the frame from the first state to the second state based on a scroll command from a user input device from a first frame to a second frame of the plurality of frames.

The operations may further include transmitting a user query. The user query may include an identification of a position within the storyboard the user query was created. The operations may further include presenting the position within the storyboard the user query was created in response to a request to access to the user query and transmitting a response to the user query in response to user input.

The operations may further include storing user query data, determining a plurality of variables associated with user interaction with the frames, and determining analytic data based on the variables, the analytic data defining a level of interaction with the frames. The operations may further include generating a report based on the analytic data.

The report based on the analytic data may include information defining a level of effort by a student, a level of comprehension of the student, effort trends by the student, a learning objective the student should focus on based on a number of likes associated with the learning objective, a learning objective the student should focus on based on performance of the student as to the leaning objective, or combinations thereof. Further, the report based on the analytic data may include information defining a number of questions presented by the student, a number of annotations to the storyboard by the student, a ranking of learning objectives most misunderstood by the student, a ranking of which questions are most misunderstood by the student, a ranking of which learning objectives are associated with the most questions, a ranking of students that require support based on performance, or combinations thereof.

The analytic data may define interactions with at least one question presented at the frames, and the operations may further include generating the report based on the analytic data includes a review sheet of the frames specific to a first interactions with the frames from a first client device. Further, the analytic data may define interactions with at least one question presented at the frames, and the operations may further include generating the report based on the analytic data includes a ranking of the interactions with the at least one question.

Examples described herein also provide a method including displaying a storyboard via a user output device. The story board may include a plurality of frames. The frames may include an illustration, the illustration including a first state and a second state. The method may further include changing the illustration within the frame from the first state to the second state based on a scroll command from a user input device from a first frame to a second frame of the plurality of frames.

The method may further include transmitting a user query. The user query may include an identification of a position within the storyboard the user query was created. The method may further include presenting the position within the storyboard the user query was created in response to a request to access to the user query and transmitting a response to the user query in response to user input.

The method may further include storing user query data, determining a plurality of variables associated with user interaction with the frames, and determining analytic data based on the variables, the analytic data defining a level of interaction with the frames.

The method may further include generating a report based on the analytic data. The report may be based on the analytic data includes information defining a level of effort by a student, a level of comprehension of the student, effort trends by the student, a learning objective the student should focus on based on a number of likes associated with the learning objective, a learning objective the student should focus on based on performance of the student as to the leaning objective, or combinations thereof. The method may further include generating a report based on the analytic data. The report may be based on the analytic data includes information defining a number of questions presented by the student, a number of annotations to the storyboard by the student, a ranking of learning objectives most misunderstood by the student, a ranking of which questions are most misunderstood by the student, a ranking of which learning objectives are associated with the most questions, a ranking of students that require support based on performance, or combinations thereof.

The analytic data may define interactions with at least one question presented at the frames, and the method may further include generating the report based on the analytic data includes a review sheet of the frames specific to a first interactions with the frames from a first client device. The analytic data defines interactions with at least one question presented at the frames, and the method may further include generating the report based on the analytic data includes a ranking of the interactions with the at least one question.

Examples described herein also provide a system including a processor, and a non-transitory computer-readable media storing instructions that, when executed by the processor, causes the processor to perform operations including displaying a storyboard via a user output device. The story board may include a plurality of frames, the frames including an illustration, the illustration including a first state and a second state. The operations may further include changing the illustration within the frame from the first state to the second state based on a scroll command from a user input device from a first frame to a second frame of the plurality of frames, transmitting a user query, the user query including an identification of a position within the storyboard the user query was created, presenting the position within the storyboard the user query was created in response to a request to access to the user query, and transmitting a response to the user query in response to user input.

The operations may further include transmitting a user query, the user query including an identification of a position within the storyboard the user query was created, presenting the position within the storyboard the user query was created in response to a request to access to the user query, and transmitting a response to the user query in response to user input. The operations may further include storing user query data, determining a plurality of variables associated with user interaction with the frames, and determining analytic data based on the variables, the analytic data defining a level of interaction with the frames. The operations may further include generating a report based on the analytic data.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Turning now to the figures, FIGS. 1 through 27 illustrate a manner in which curriculum is created, displayed, and interacted with within the educational platform, according to an example of the principles described herein. Beginning with FIG. 1, FIG. 1 illustrates a storyboard presented on a user interface, according to an example of the principles described herein. The storyboard of FIG. 1 may also be referred to as a three-dimensional (3D) canvas or presentation. The storyboard of FIG. 1 may include a number of frames as fundamental text blocks. The frames may move and animate as the frames within the presentation are moved in order. Further, each frame may have multiple states including a first state before the frame enters view within the presentation, at least a second state while the frame is in view within the presentation, and a third state as or after the frame exits from view within the presentation. In one example, a custom breakpoint may be created such as, for example, when a frame is approximately 50% in view within the presentation before the state of the frame changes from the first state to the second state. Further, in one example, the state of the frame may change in a scoped manner wherein after the frame exits the view but before a next frame enters the view, the state of the frame may change.

The frames may include a number of different types of content that may define the type of frame included. These types of frames include, for example, a frame including text, a definition frame including definitions of terms included in the presentation, a quote frame including quotes pertinent to the presentation, an expandable portions such as dropdown menus to select form that cause the frame to change, a table, question portions such as, for example, multiple choice, number, and free response questions, and combinations of the above. In this manner, any type of non-interactive and/or interactive text may be presented within the frames.

The presentation may also include a number of visualizations. The visualizations may appear in the format of a canvas. A canvas may be any container that holds various drawing elements (lines, shapes, text, frames containing other elements, etc.), in some examples, arranges the logical representation of a user interface or graphical scene, and may define the spatial representation and allow the user to interact with the elements via a graphical user interface. In one example, each canvas displayed within the visualization may have unique components, and each component within the canvas may have unique attributes.

Some types of canvases may include, for example, a graph, a flowchart, and a chart, among a myriad of other types of visual elements. A graph within the canvas may include a number of components including, for example, a line (including colors, functions, etc.), a point, a label, an area, and a tangent, among a myriad of other components. A flowchart within the canvas may include node components, and edge components, among a myriad of other components. A chart within the canvas may include a pie chart including colors, sizes of portions of the pie chart, and values (in terms of a percentage out of 100), among a myriad of other components presentable within a pie chart. A chart within the canvas may also include a line chart including colors, sizes, and values, among a myriad of other components presentable within a line chart.

Interaction with the frames such as movement through the number of frames may cause a number of attributes of the components within the visualizations to animate. For example, when a frame comes into view, the presentation may cause the visualization to animate including altering the attributes of the components within the canvas resulting in a number of animations within the canvas of the visualization. This animation keeps a student engaged in the presentation and assist in further understanding of the topic of study. Any type and amount of animation may be provided within the presentation.

The presentation may also include a number of user-interactive elements that the presenter (e.g., educator, professor, teacher, etc.) and/or the participant (e.g., the student, user, etc.) may interact with. FIG. 2 illustrates an interactive frame that may be presented in the storyboard of FIG. 1, according to an example of the principles described herein. Further, FIG. 3 illustrates an interactive frame that may be presented in the storyboard of FIG. 1, according to an example of the principles described herein.

Each frame within the presentation may include text. The text within the frames may be selected by a user via a user-selection device such as a mouse. In one example, selection of the text within the frame(s) allows a participant to ask a question associated with the selected text, highlight or mark the selected text, and annotate the selected text by adding comments or other notes to the text inline or within out-of-line comment balloons, among other actions associated with the selected text. Each annotation and/or highlight may be anchored to the location of the frame in the page such that when the user selects the link for the annotation, the storyboard will scroll down to the location of the frame in which the annotation is anchored and was originally marked.

The presenter (e.g., educator, professor, teacher, etc.) may also be provided a view of the presentation. The presenter view makes the frames and/or the text within the frames larger for viewing by the participants. Further, the presenter view may cause the visualizations to become larger as well for viewing by the participants. Still further, the presenter view may add a number of annotation tools described above. The presenter may make any changes to the presentation before or during the display of the presentation. For example, the presenter may alter the sizes of frames and visualizations in the presentation.

As the presenter presents the presentation to the participants (e.g., in a streaming scenario), the presenter's actions may be synchronized to the participants' screens. For example, a position of the presenter's pointer as input by the presenter's mouse device may cause a laser pointer simulation to appear at a corresponding location on the participants' screens as the participants view the streamed content.

In one example, the participants may scroll through the various frames within the presentation without affecting the presenter's version within the presenter view. As the participant does this, a "return to live view" button may appear to allow the participant to return to the live lecture at the point within the presentation at which the presenter is currently lecturing from. In this manner, the participant may freely access and view past and future frames separate from the frame the presenter is currently discussing and displaying but may still move back to the portion of the presentation the presenter is currently discussing (e.g., lecturing on).

As the presenter is lecturing, the participant may use any number of annotation tools (e.g., arrows, highlighting, points, pens, etc.) to annotate the presentation. As the participant annotates the presentation, a copy of the presentation may be saved to the participant's computing device so that the participant may retain their annotations. This may assist the participant in retaining any notes from the lecture for later study.

In one example, the system may track the participant's mouse positions and the annotation tools they are using. For example, a position of the participant's mouse, a scroll position, an annotation tool, a type of annotation, and a first selection using a mouse and a second selection using a mouse, among other participant interactions may be tracked live.

Further, the participants may ask questions in a real-time manner during the presentation. The questions may include, for example, an informal reaction to the presenter's lecture including presentation of a thumbs up, thumbs down, smiley face, frowned face, etc. as a reaction to the presenter's lecture. Further, the questions may include, for example, a chat session where a question is asked over text or voice by the participant and/or the presenter. For example, a presenter may ask a question and verbally to textually prompt the participant to type or speak the answer via a chat session incorporated into the presentation. The questions may further include, for example, formal questions where the questions are presented in frames. The answers to any of these types of questions may be received by the presented in real-time to allow the presenter to identify whether the topic being discussed is being understood/appreciated by the participants.

In the example of FIG. 1, a number of different types of interactive frames with which may be interacted with by a presenter or a participant is depicted. Portions of the frames may be annotated, and questions presented therein may be answered through the interactive aspects of the frames and visualizations. The visualizations may include a cube as depicted, with a gradient plane, four points located next to the gradient plane and line among other visualizations. These visualizations may change as the frames are navigated by the presenter and/or the participants as mentioned above.

Turning again to FIGS. 2 and 3, a number of different types of interactive frames with which may be interacted with by a presenter or a participant. Portions of the frames may be annotated, and questions presented therein may be answered through the interactive aspects of the frames and visualizations. For example, in FIG. 2 a box has been drawn around the "variable cost" (e.g., "VC") made by the participant or presenter to emphasize the importance of that information within the presentation. Further, in the example of FIG. 3, a question interactive frame is presented by the presenter that allows for the participant to select an answer. The presenter may use the selection made by the participant as an in-class learning tool, as an indication as to how many participants are attentive to the presentation, as a tool to determine the understanding of the participants, and for other reasons or purposes.

FIG. 4 illustrates a visualization including a table and a chart, according to an example of the principles described herein. Any type of information may be presented using the present systems and methods. In FIG. 4, a presentation as presented by a presenter during a lecture or other type of presentation is depicted. The presentation of FIG. 4 may include a number of frames including text, a visualization, and a selectable table of contents that allows a user to select a portion of the presentation and display that selection. For example, if a presenter or participant were to select an entry in the table, a portion of the chart including a line in the chart may be presented in bold or by other means such that selection of a portion of the frame may affect the display of the visualization. Further, as the frames are scrolled, the visualization may change and colored portions within the frames may be presented with the same color in the visualization as the frames are scrolled. As the frame enters the view, that frame may cause the visualization to change its state based in the change of state of the frame, and as the frame exits view, the ability of that frame to change the visualization may end. Any number of frames may be used to change the visualization in turn.

Figure 5:
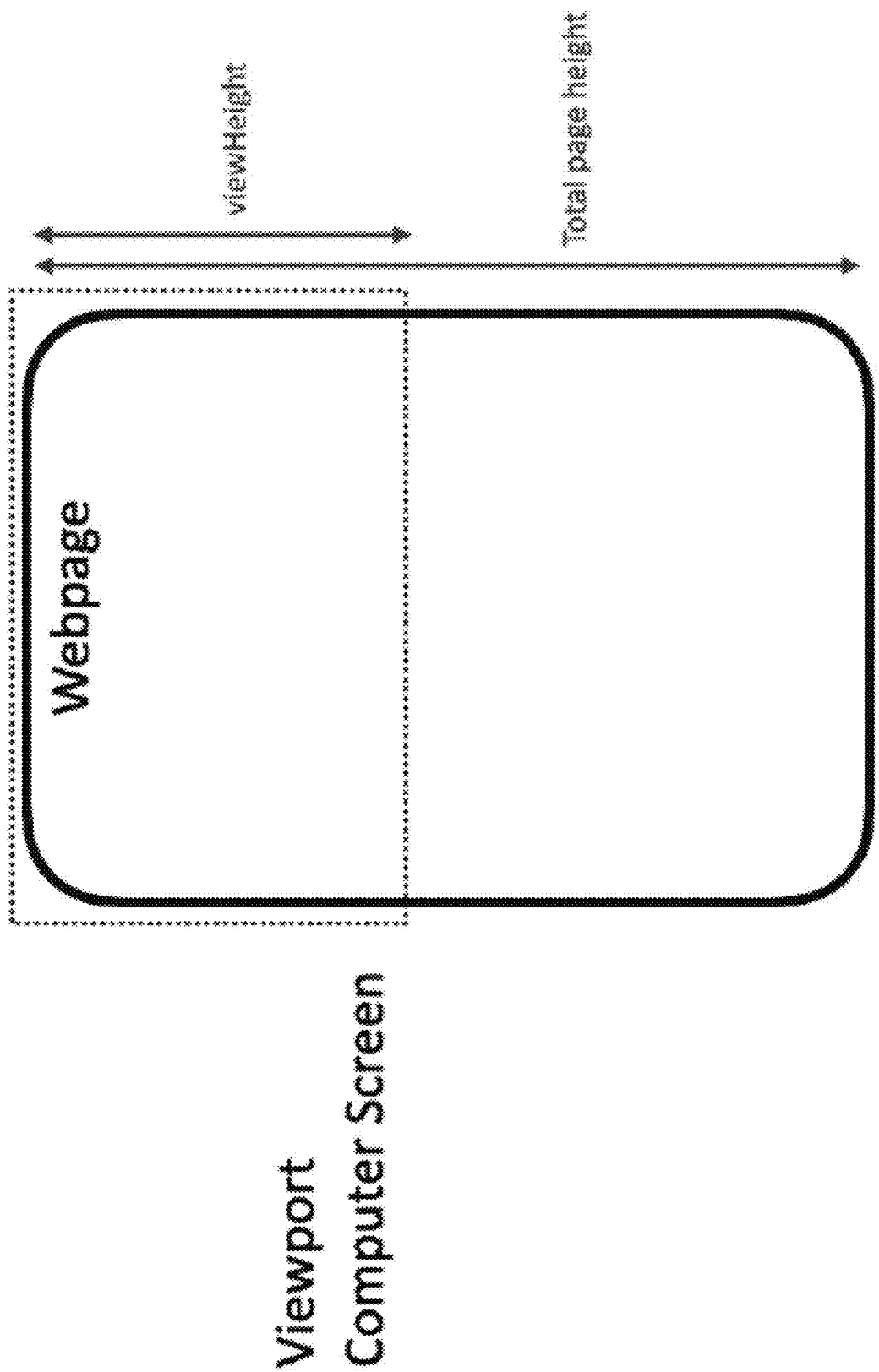
FIG. 5 illustrates a viewport of a screen of a computing device on which the presentation is displayed, according to an example of the principles described herein.
Figure 6:
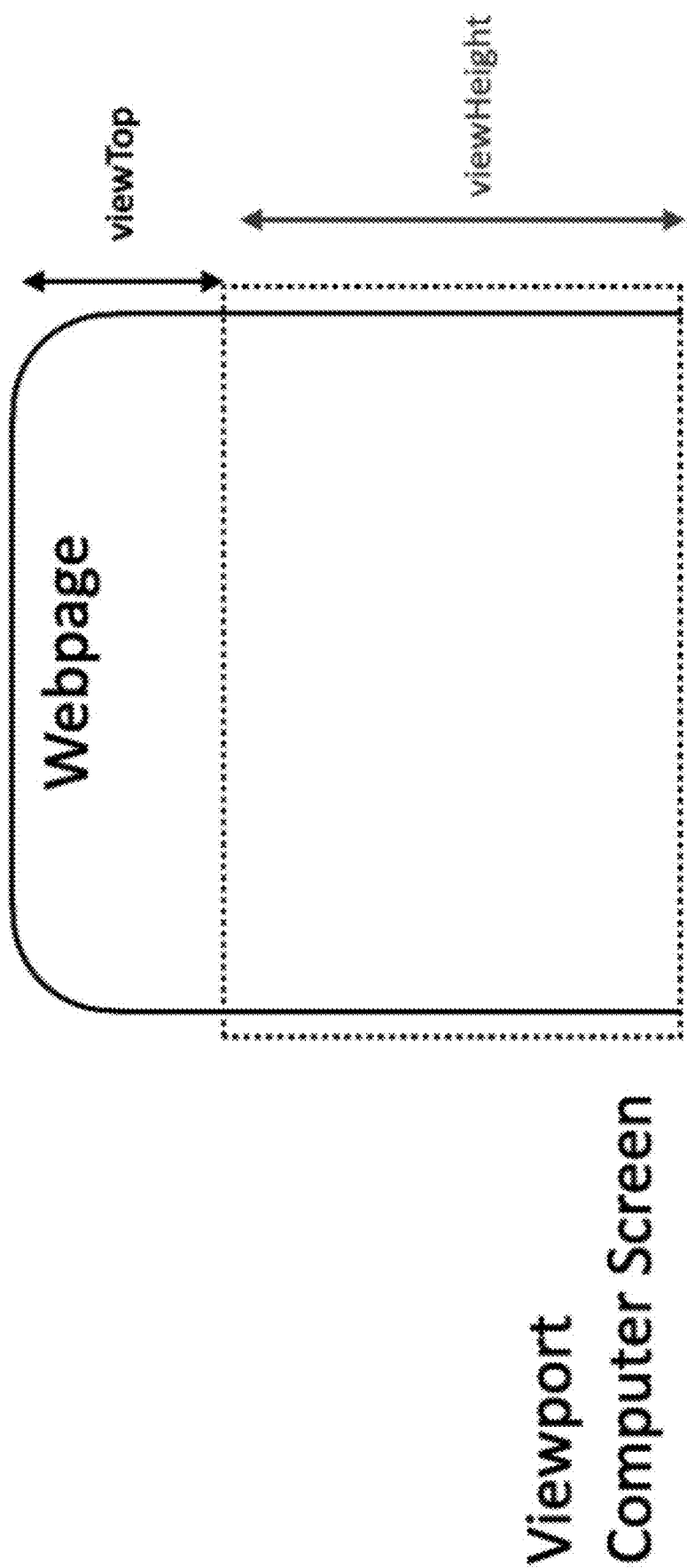
FIG. 6 illustrates a viewport of FIG. 5 as the viewport is being scrolled, according to an example of the principles described herein.
Figure 7:
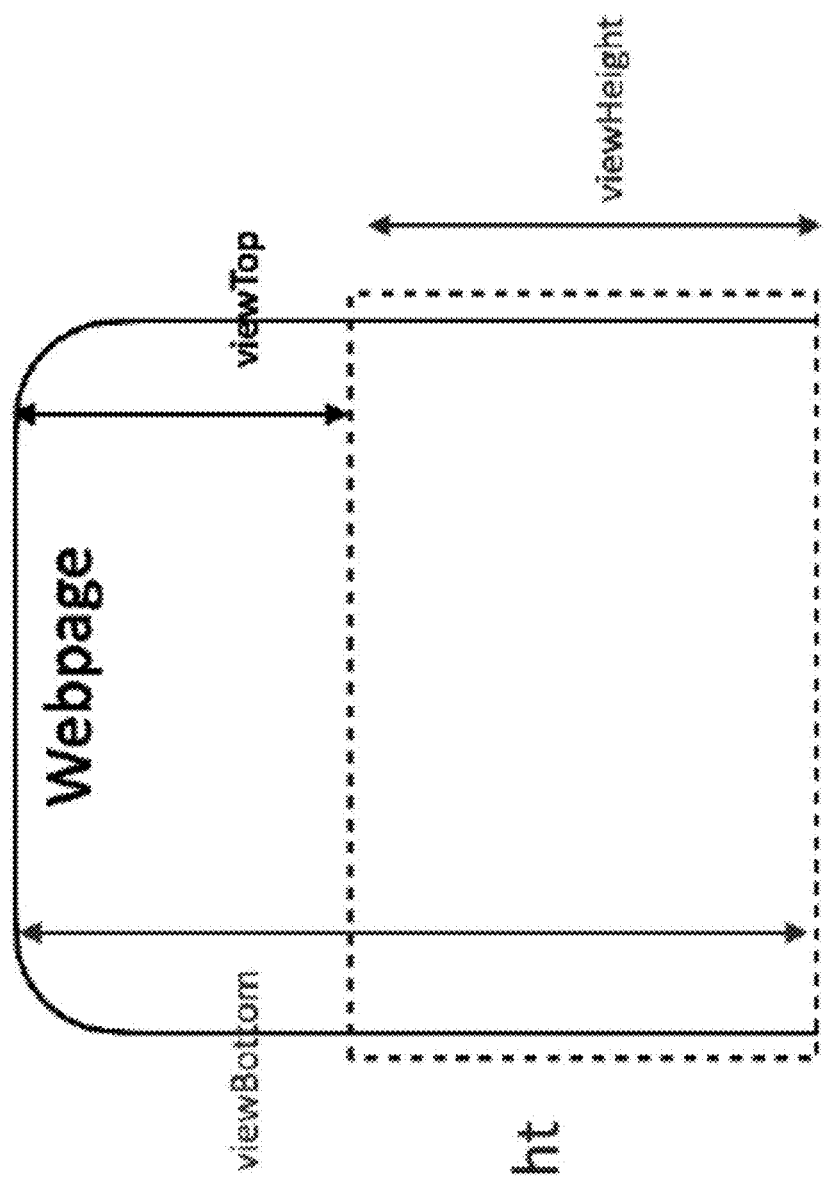
FIG. 7 illustrates a viewport of FIG. 5 as the viewport is being scrolled and depicts the non-viewable portions of the presentation, according to an example of the principles described herein.

FIG. 5 illustrates a viewport of a screen of a computing device on which the presentation is displayed, according to an example of the principles described herein. The viewHeight is the height of the viewport of the screen of the computing device as designated in dashed lines. FIG. 6 illustrates a viewport of a screen of a computing device on which the presentation is displayed as the viewport is being scrolled, according to an example of the principles described herein. As the scrolling occurs, the frame moves behind the viewport, and the distance from the top of the text (e.g., a webpage as depicted) may increase or otherwise change. The distance from the top of the text to the top of the viewport is defined as the viewTop. FIG. 7 illustrates a viewport of a screen of a computing device on which the presentation is displayed as the viewport is being scrolled and depicts the non-viewable portions of the presentation. In FIG. 7, a viewBottom is depicted. The viewBottom may be defined as the distance from the top of the text (e.g., a webpage as depicted) to the bottom of the viewport (e.g., viewTop±viewHeight=viewBottom).

Figure 8:
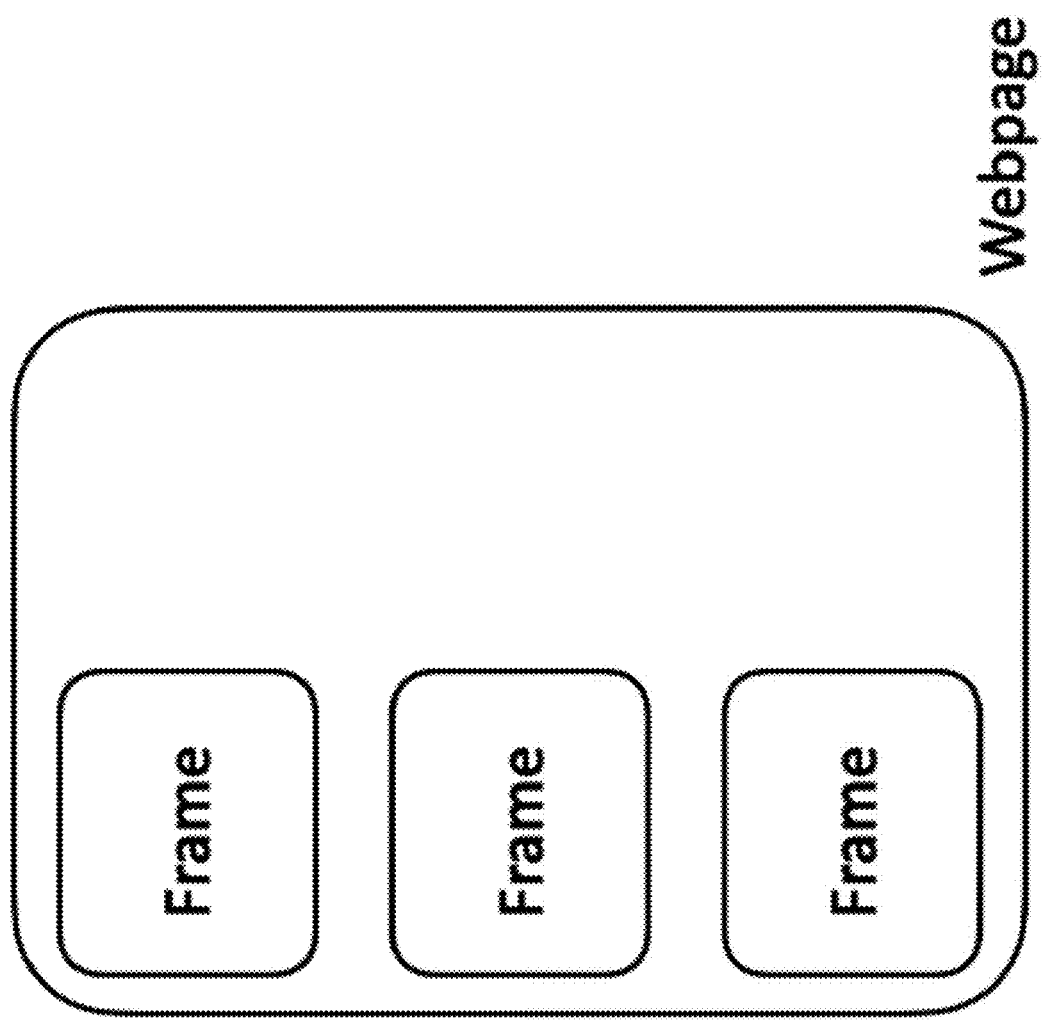
FIG. 8 illustrates a number of frames within a presentation, according to an example of the principles described herein.
Figure 9:
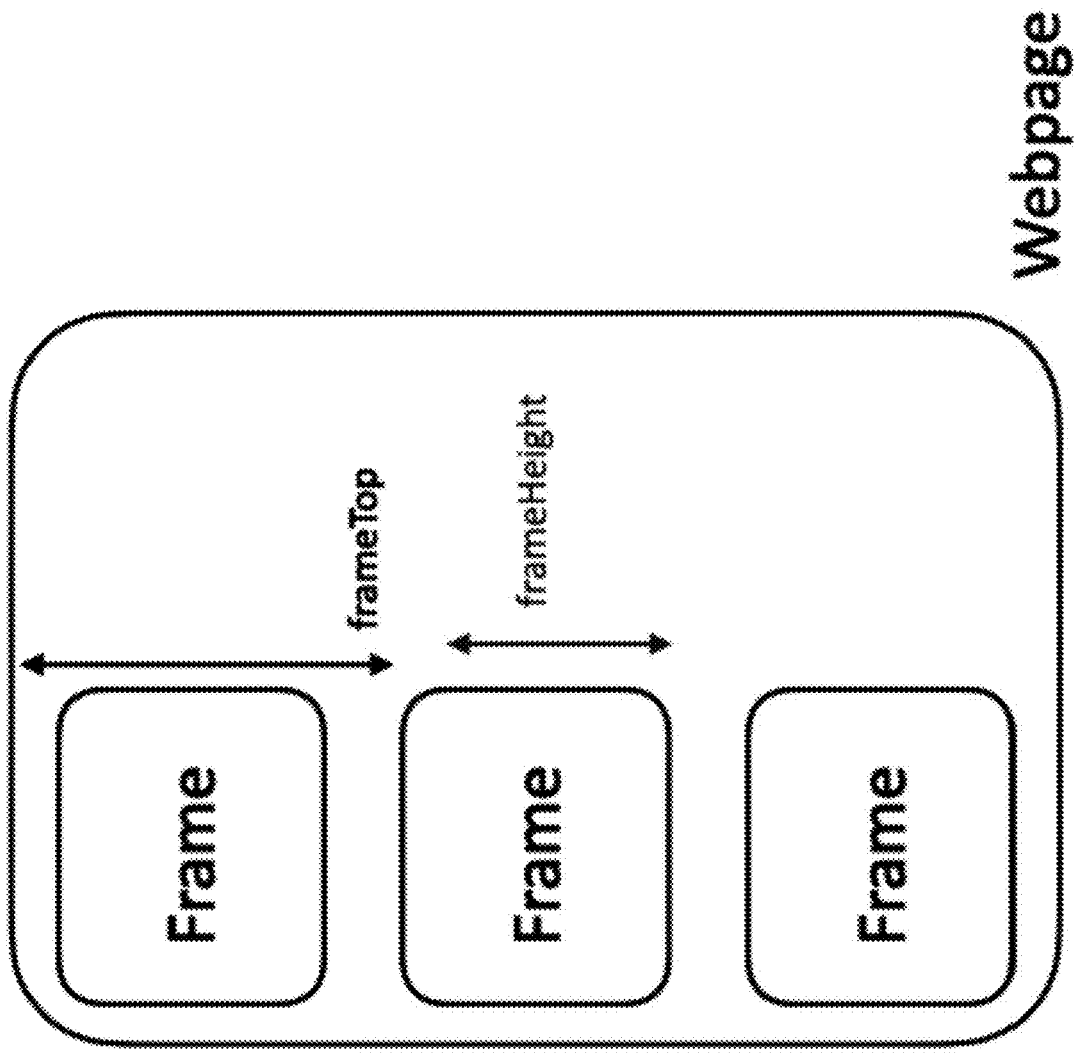
FIG. 9 illustrates a frameTop and a frameHeight of a number of frames, according to an example of the principles described herein.

FIG. 8 illustrates a number of frames within a presentation, according to an example of the principles described herein. The frames are fixed. However, when a user is scrolling, the webpage may be moving behind the viewport while the frames remain fixed. FIG. 9 illustrates a frameTop and a frameHeight of a number of frames, according to an example of the principles described herein. For example, FIG. 9 depicts a frameHeight defining a height of a given frame within the presentation. Further, in FIG. 9 depicts a frameTop which may be defined as a distance from the top of the frame to the top of the page (e.g., the webpage).

Figure 10:
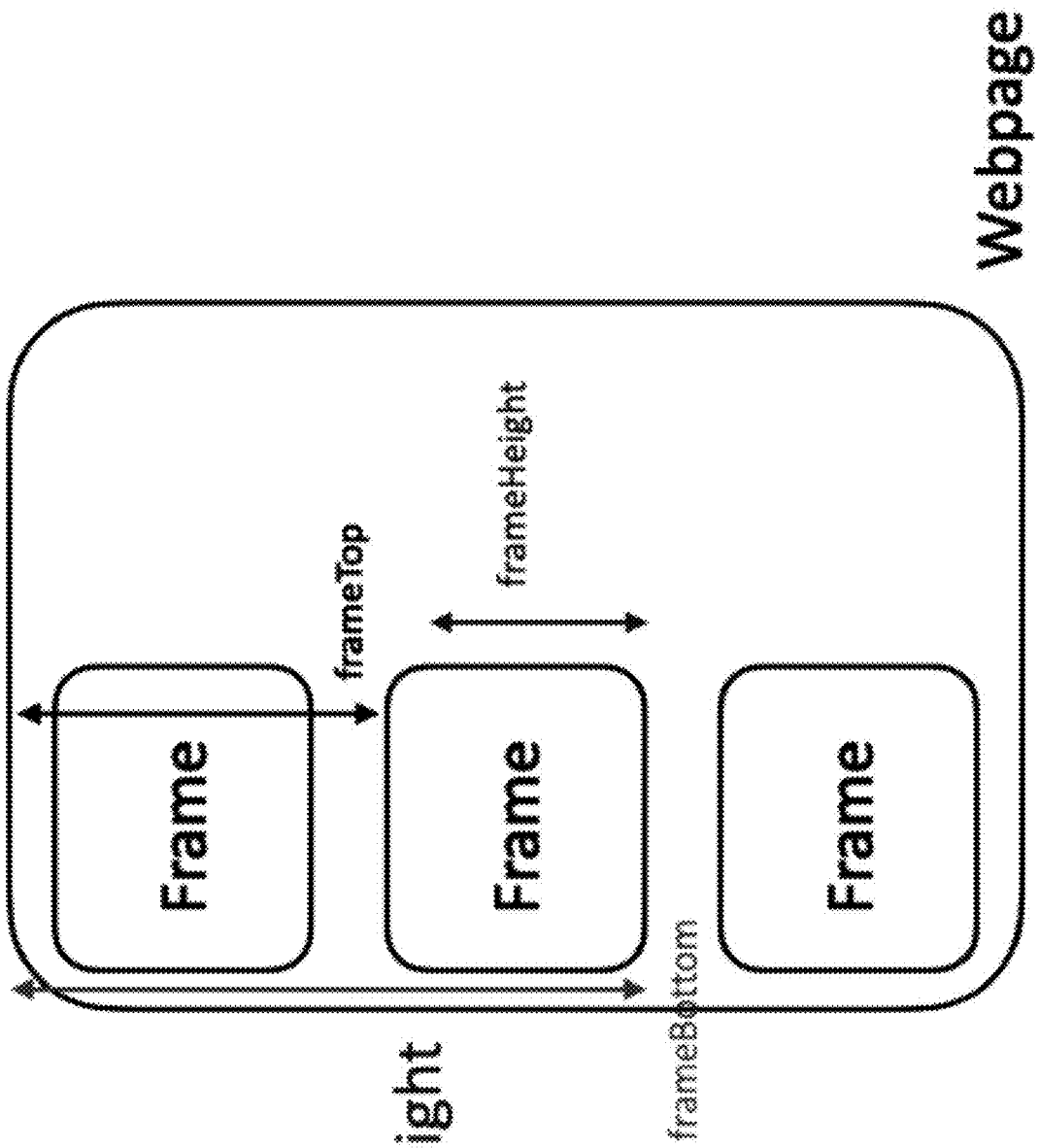
FIG. 10 illustrates a frameBottom of a number of frames, according to an example of the principles described herein.

FIG. 10 illustrates a frameBottom of a number of frames, according to an example of the principles described herein. FIG. 10 depicts a frameBottom which may be defined as the frameTop+frameHeight=frameBottom. The values for the frameTop and frameBottom do not change as the presentation is scrolled. In this manner, the frames remain fixed.

Figure 11:
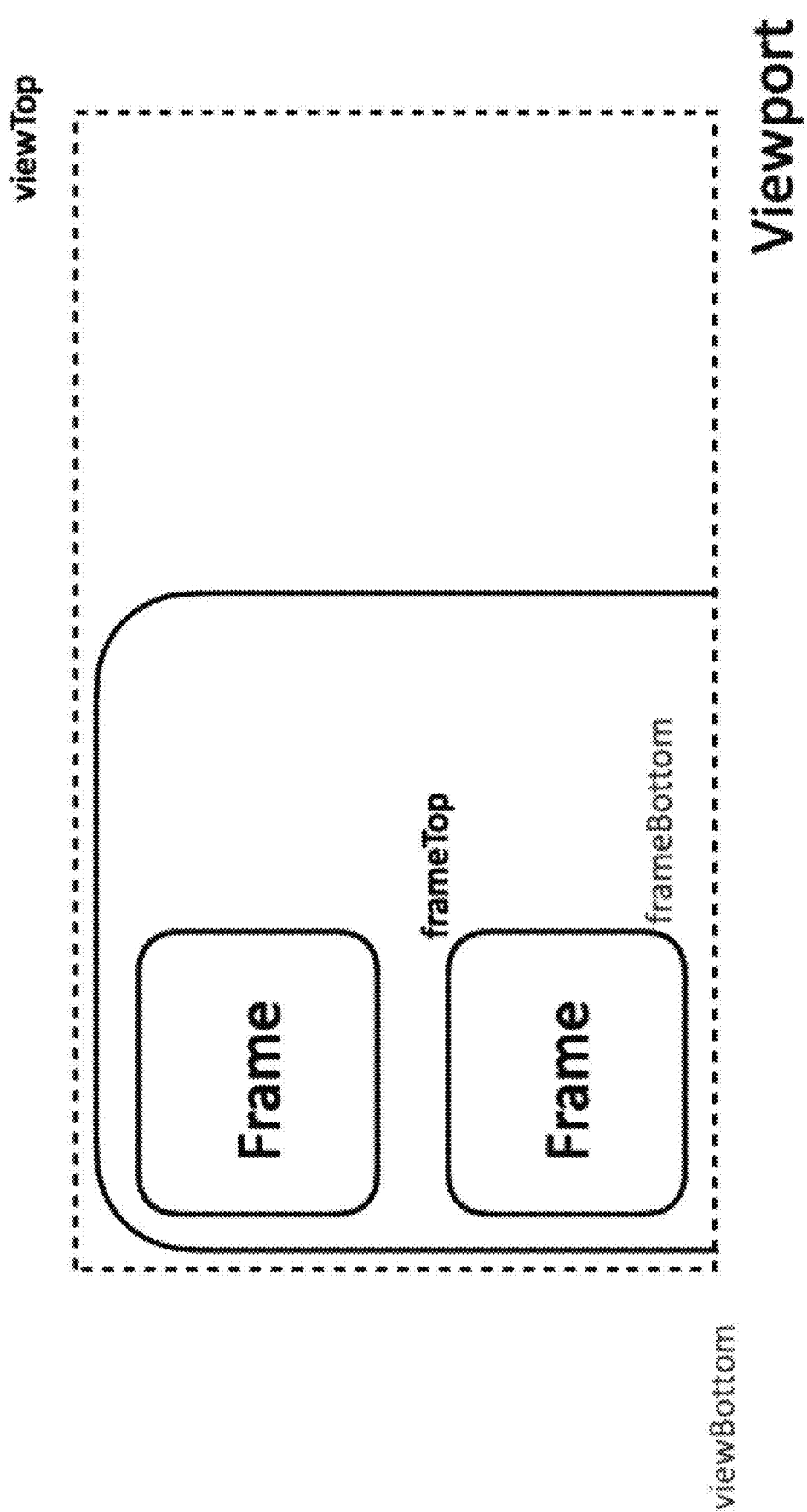
FIG. 11 illustrates the viewport, according to an example of the principles described herein.

FIG. 11 illustrates the viewport, according to an example of the principles described herein. The viewport including the viewTop, the viewBottom, the frameTop, and the frameBottom are depicted. The viewTop is at the top of the page (e.g., webpage) and has a value of 0. The viewBottom is equal to the height of the viewport in the state depicted in FIG. 11.

Figure 12:
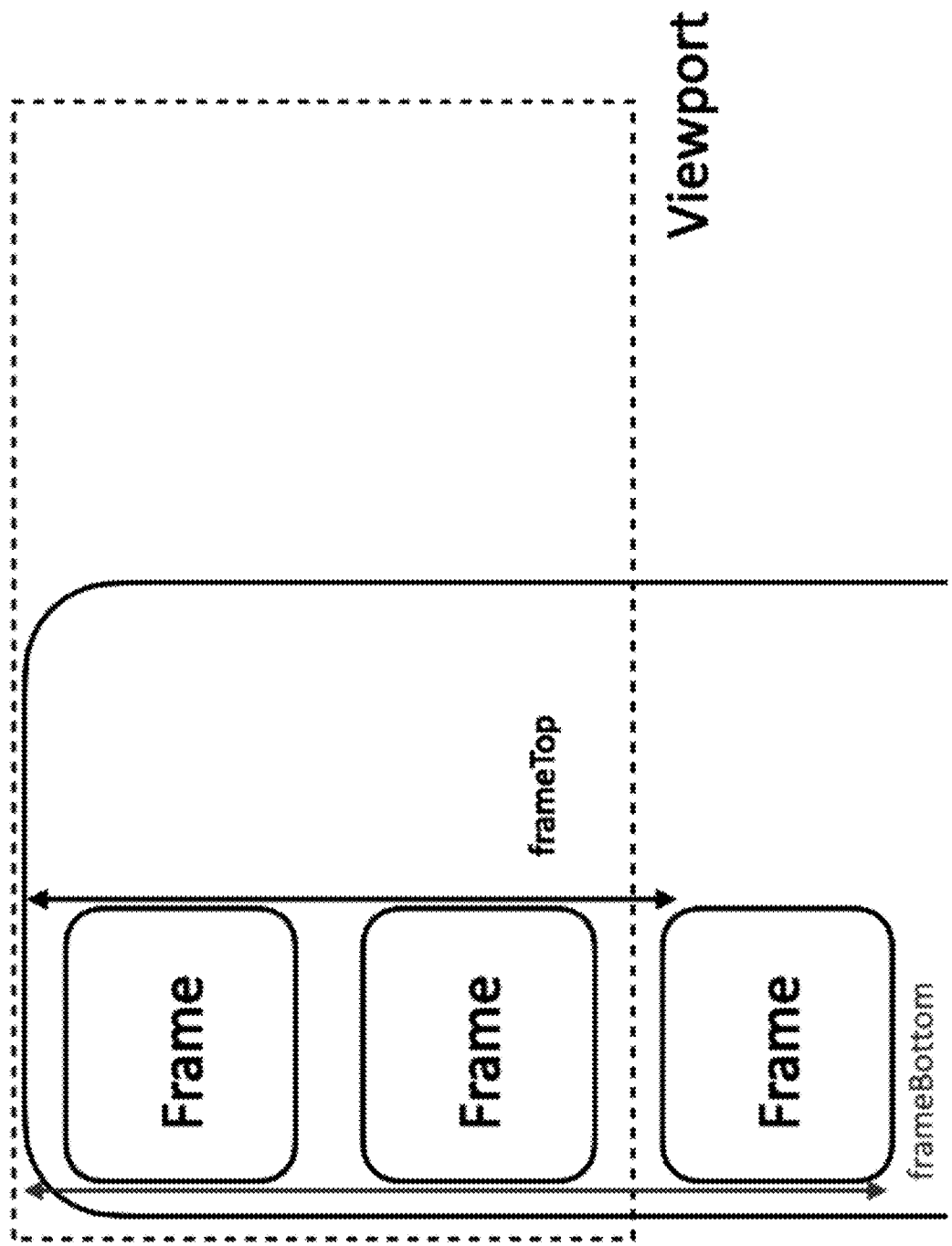
FIG. 12 illustrates a scrolling of the frames through the viewport, according to an example of the principles described herein.
Figure 13:
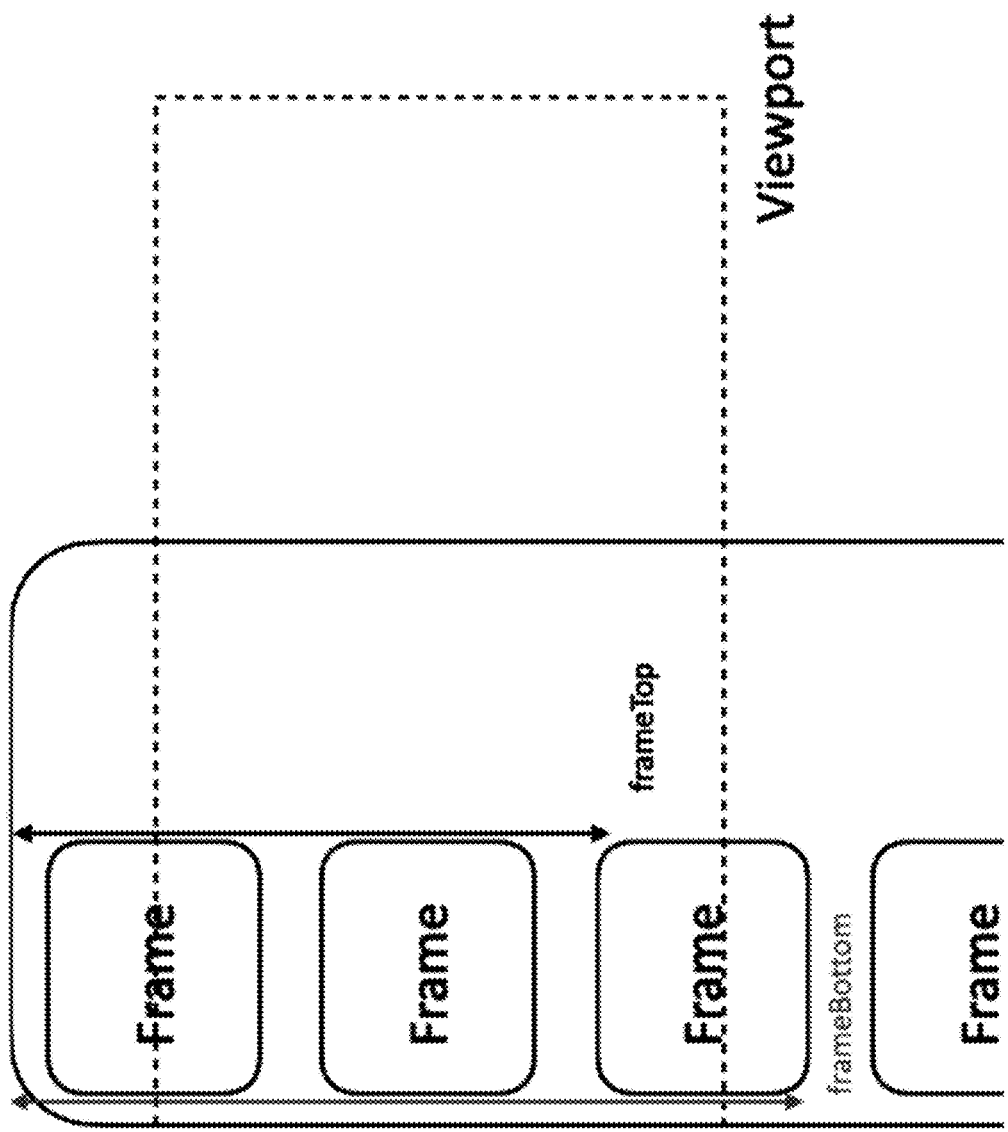
FIG. 13 illustrates a scrolling of the frames through the viewport at a subsequent state, according to an example of the principles described herein.

FIG. 12 illustrates a scrolling of the frames through the viewport, according to an example of the principles described herein. In FIG. 12, the beginning of a scrolling of the frames through the viewport is depicted. FIG. 13 illustrates a scrolling of the frames through the viewport at a subsequent state, according to an example of the principles described herein. FIG. 13 depicts the entrance of a frameTop of a subsequent frame entering the viewport. The manner as to how the values of frameTop and frameBottom do not change but the values of viewTop and viewBottom do change is depicted in FIG. 13. As noted in FIG. 13, the length of the arrows depicted in FIG. 13 did not change with respect to their length as depicted in FIG. 12 and have simply moved up. The frameTop and frameBottom are predefined.

Figure 14:
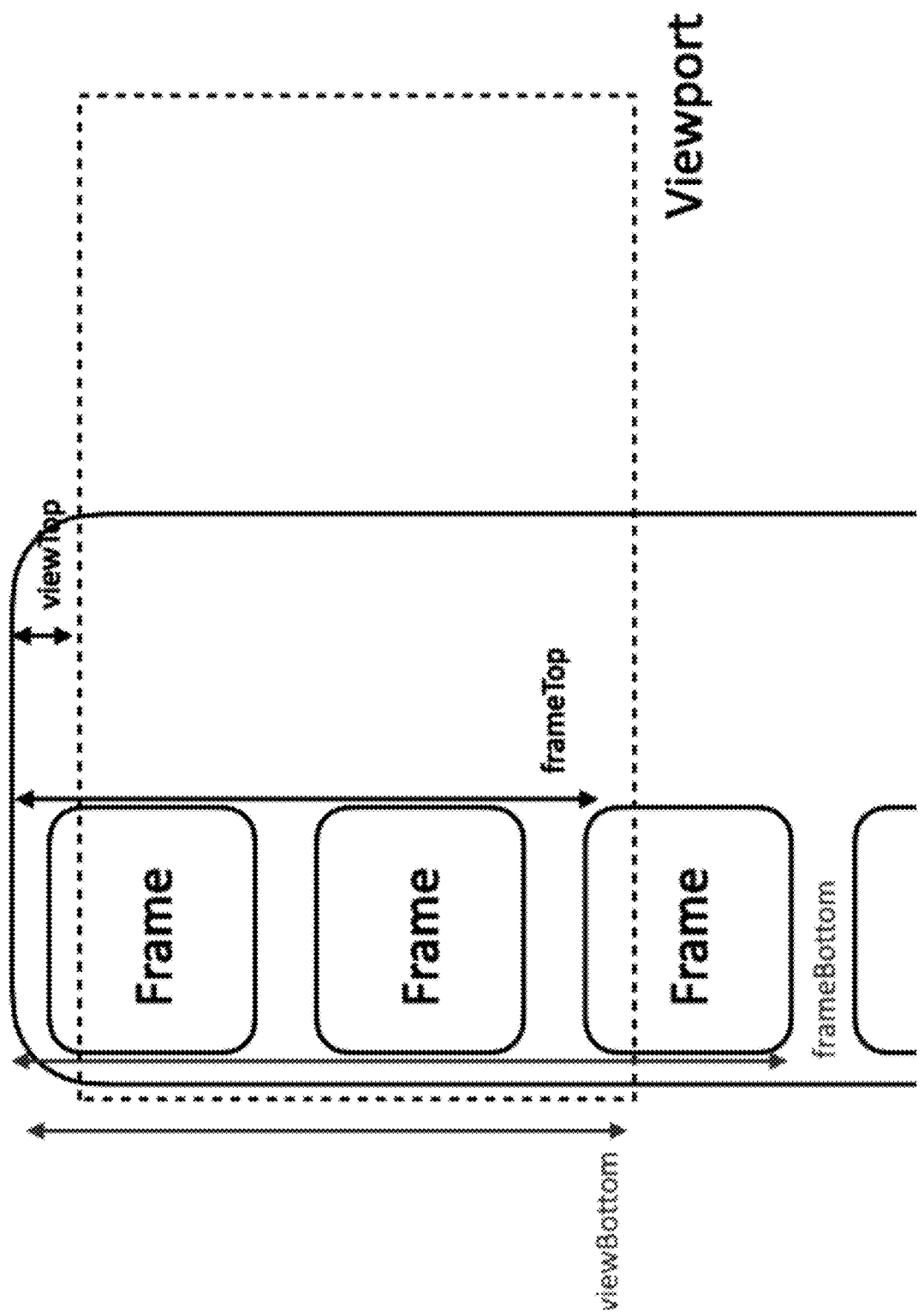
FIG. 14 illustrates a scrolling of the frames through the viewport at a subsequent state, according to an example of the principles described herein.
Figure 15:
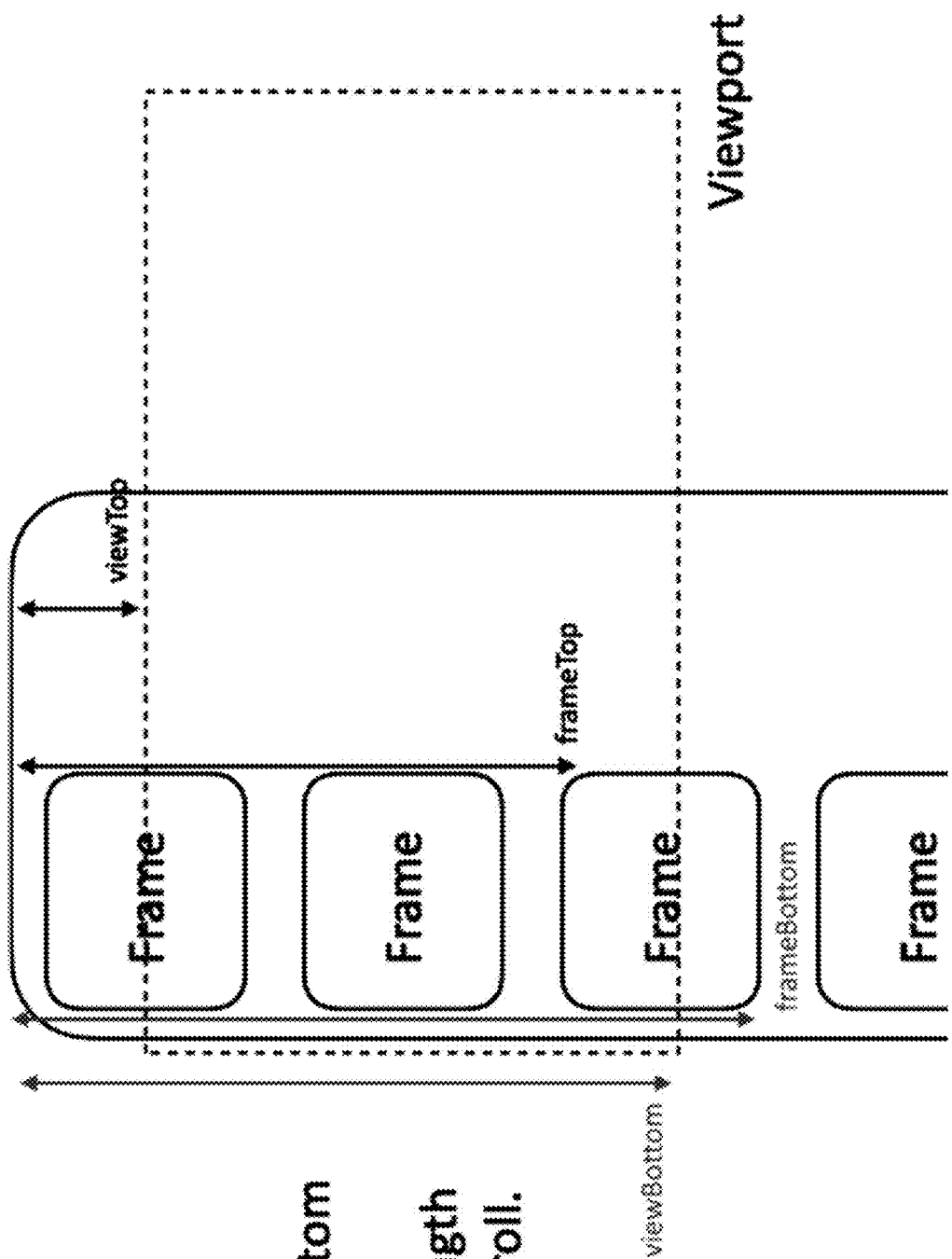
FIG. 15 illustrates a scrolling of the frames through the viewport at a subsequent state, according to an example of the principles described herein.

FIG. 14 illustrates a scrolling of the frames through the viewport at a subsequent state, according to an example of the principles described herein. FIG. 14 depicts the manner as to how the values of frameTop and frameBottom do not change but the values of viewTop and viewBottom do change. FIG. 15 illustrates a scrolling of the frames through the viewport at a subsequent state, according to an example of the principles described herein. In FIG. 15 the manner as to how the values of frameTop and frameBottom do not change but the values of viewTop and viewBottom do change is depicted. Thus, the viewBottom and viewTop are dynamic as their length changes as the user scrolls through the frames.

Figure 16:
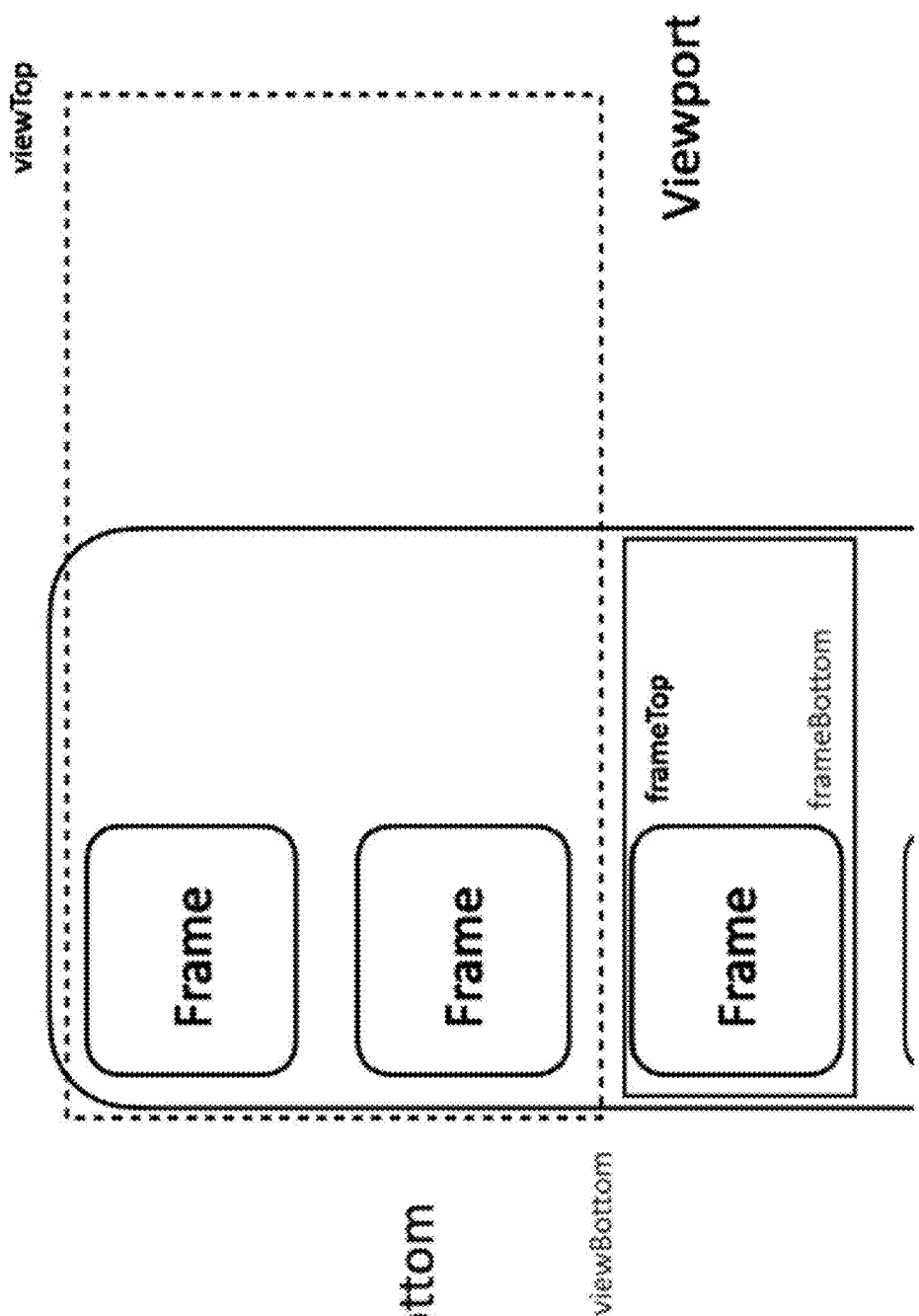
FIG. 16 illustrates a scrolling of the frames through the viewport at a subsequent state, according to an example of the principles described herein.

FIG. 16 illustrates a scrolling of the frames through the viewport at a subsequent state, according to an example of the principles described herein.

More specifically, FIG. 16 depicts the manner as to how the values of frameTop and frameBottom do not change but the values of viewTop and viewBottom do change. The ability to retain the values of frameTop and frameBottom as unchanging but allow the values of viewTop and viewBottom to change dynamically as scrolling occurs allows for the animations within associated visualizations to be triggered during scrolling. When frameTop is greater than viewBottom, the frame is not within the viewport as depicted in FIG. 16.

Figure 17:
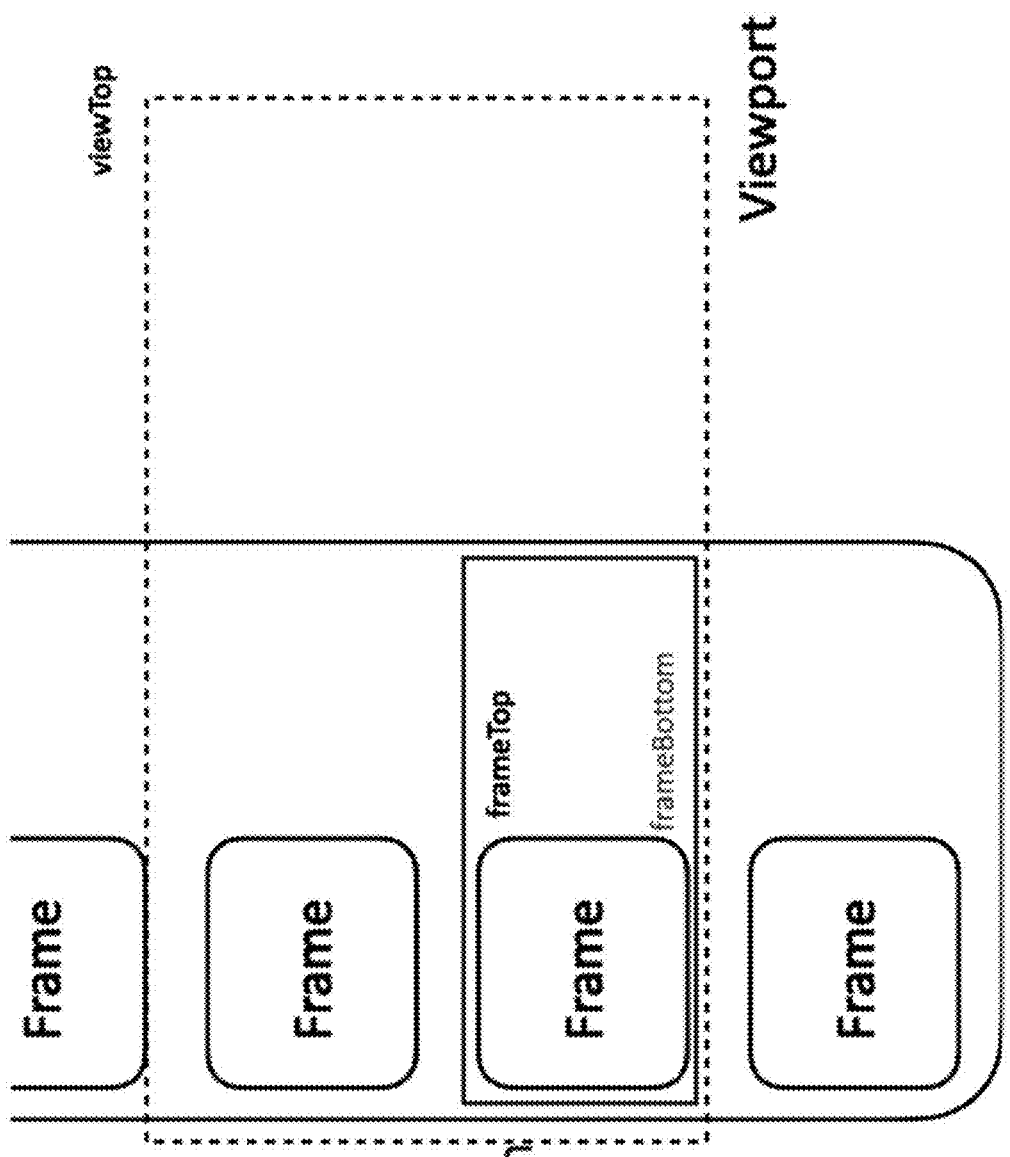
FIG. 17 illustrates a scrolling of the frames through the viewport at a subsequent state, according to an example of the principles described herein.

FIG. 17 illustrates a scrolling of the frames through the viewport at a subsequent state, according to an example of the principles described herein. FIG. 17 depicts the manner as to how the values of frameTop and frameBottom do not change but the values of viewTop and viewBottom do change. The ability to retain the values of frameTop and frameBottom as unchanging but allow the values of viewTop and viewBottom to change dynamically as scrolling occurs allows for the animations within associated visualizations to be triggered during scrolling. When viewBottom is greater than frameBottom, the frame is fully within the viewport as depicted in FIG. 17.

Figure 18:
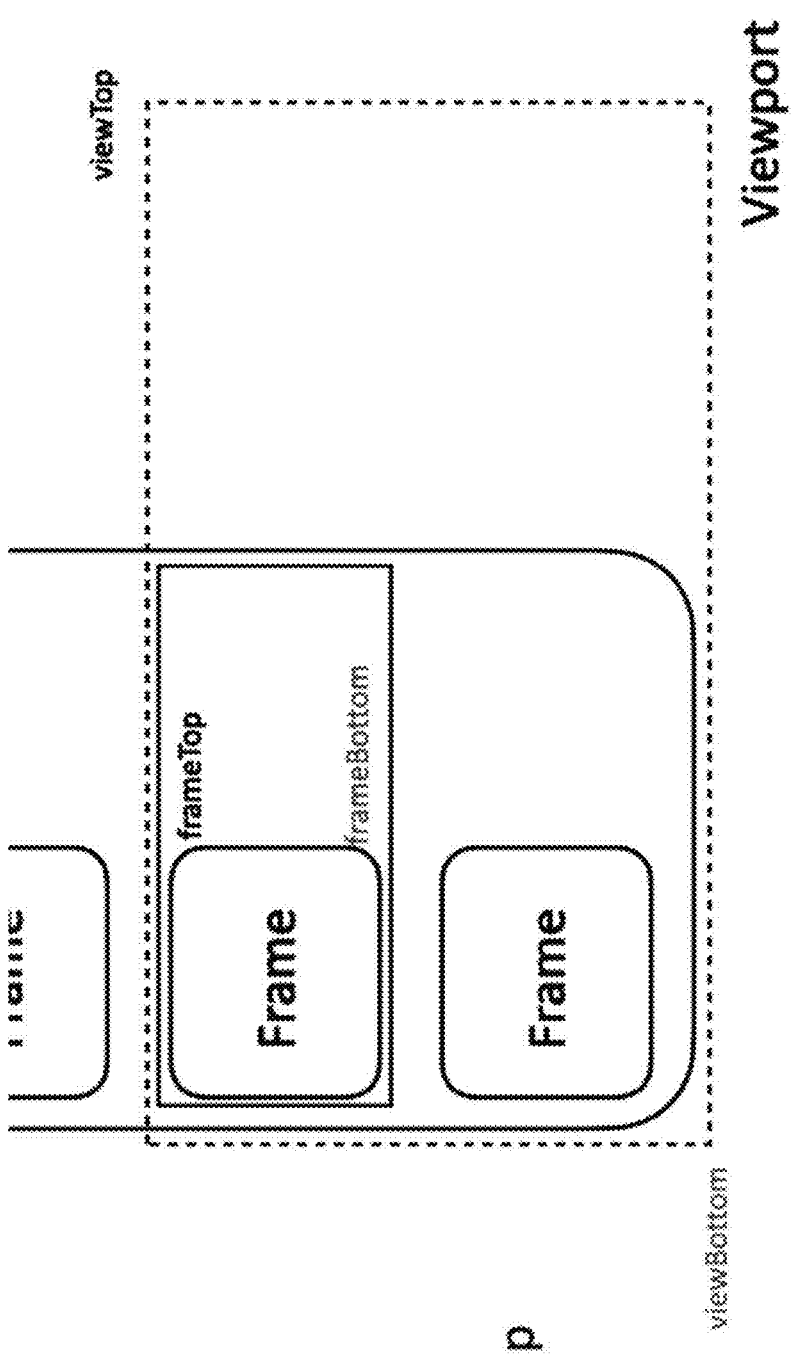
FIG. 18 illustrates a scrolling of the frames through the viewport at a subsequent state, according to an example of the principles described herein.

FIG. 18 illustrates a scrolling of the frames through the viewport at a subsequent state, according to an example of the principles described herein. FIG. 18 depicts the manner as to how the values of frameTop and frameBottom do not change but the values of viewTop and viewBottom do change. The ability to retain the values of frameTop and frameBottom as unchanging but allow the values of viewTop and viewBottom to change dynamically as scrolling occurs allows for the animations within associated visualizations to be triggered during scrolling. When viewTop is less than frameTop, the frame is within the viewport as depicted in FIG. 18 but is about to exit the viewport.

Figure 19:
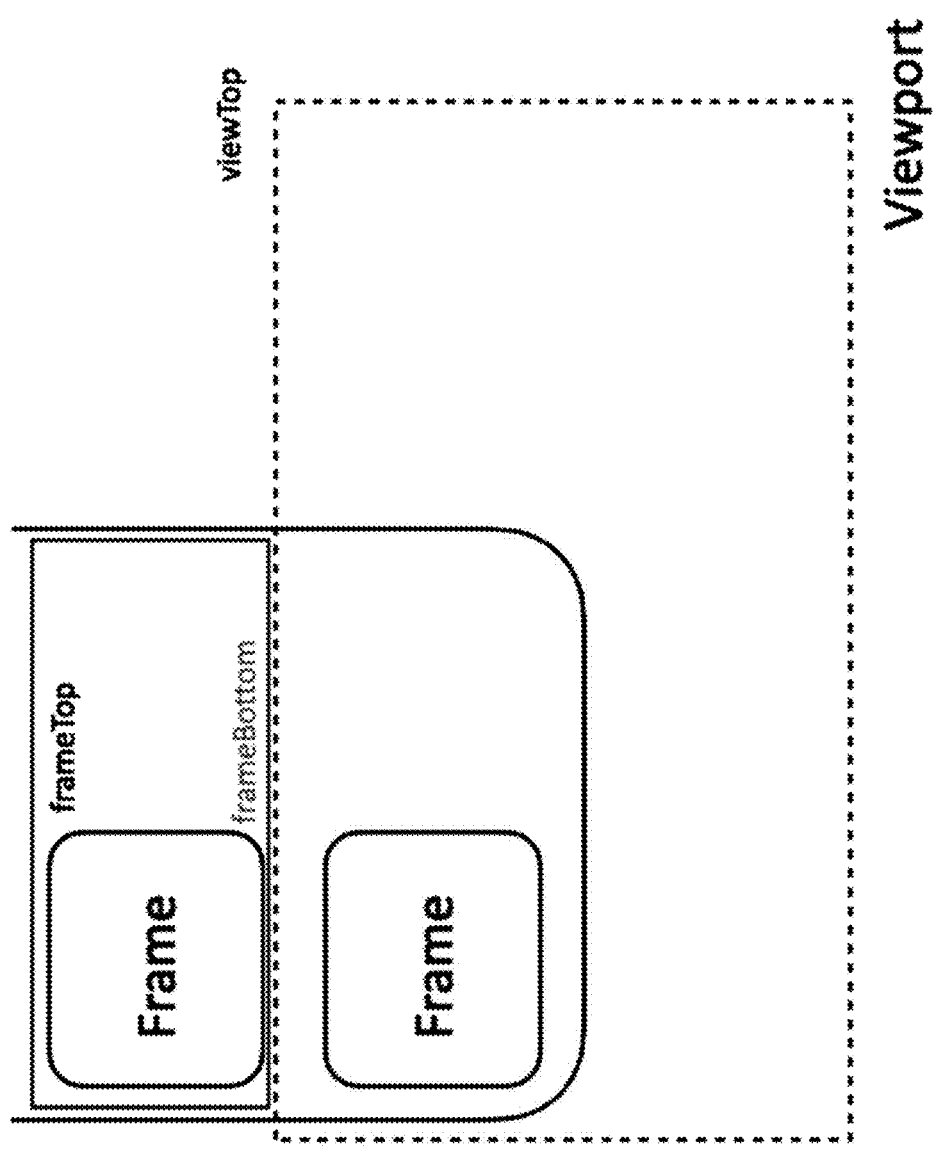
FIG. 19 illustrates a scrolling of the frames through the viewport at a subsequent state, according to an example of the principles described herein.

FIG. 19 illustrates a scrolling of the frames through the viewport at a subsequent state, according to an example of the principles described herein. FIG. 19 depicts the manner as to how the values of frameTop and frameBottom do not change but the values of viewTop and viewBottom do change. The ability to retain the values of frameTop and frameBottom as unchanging but allow the values of viewTop and viewBottom to change dynamically as scrolling occurs allows for the animations within associated visualizations to be triggered during scrolling. When viewTop is greater than frameBottom, the frame is not within the viewport as depicted in FIG. 19. Animations within the visualizations may begin when frameTop is greater than viewBottom, at any point where a portion of the frame is located in the viewport (e.g., where frameTop is greater than viewBottom through when frameBottom is less than viewTop).

Figure 20:
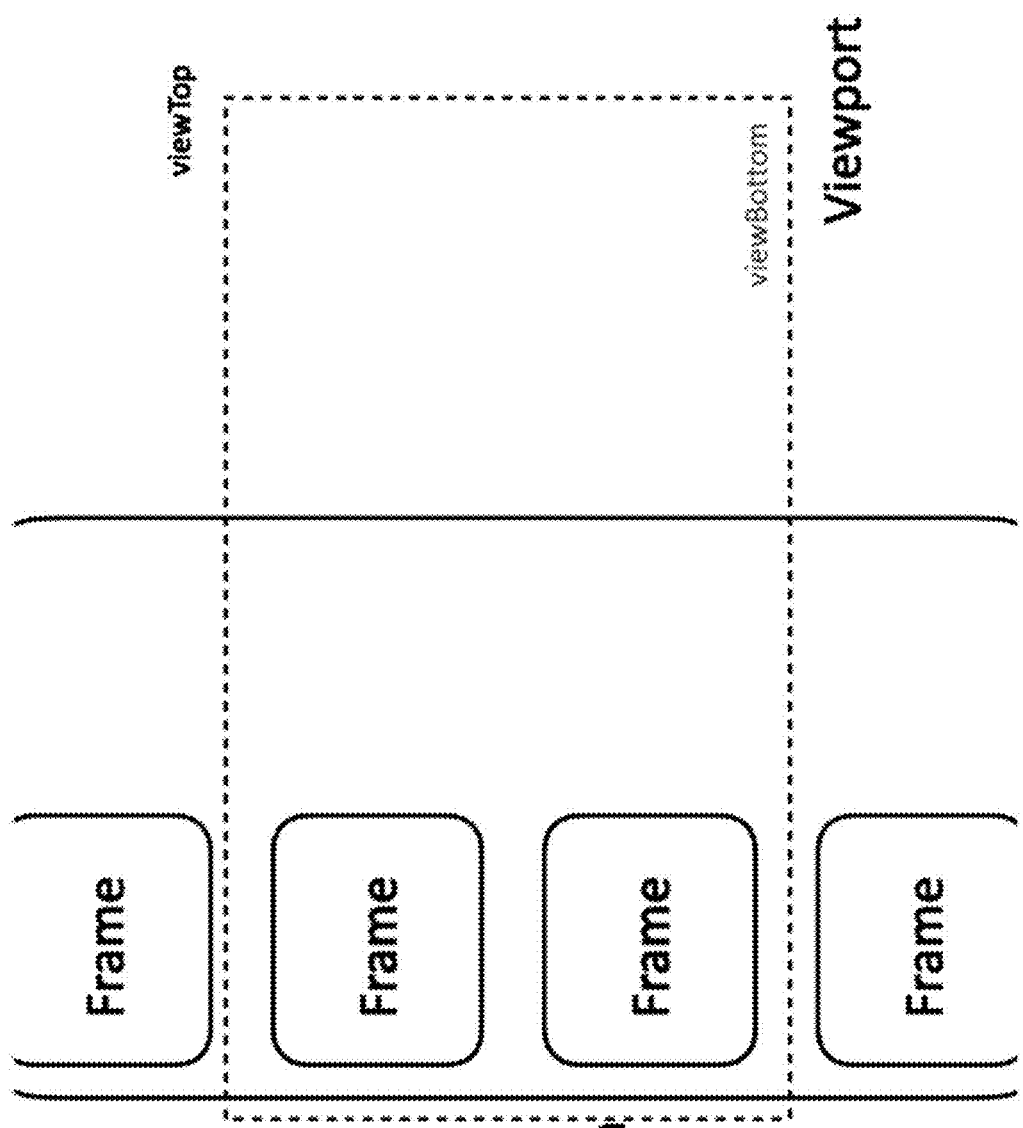
FIG. 20 illustrates a number of frames positioned within and without the viewport, according to an example of the principles described herein.

FIG. 20 illustrates a number of frames positioned within and without the viewport, according to an example of the principles described herein. Again, animations within the visualizations may begin when frameTop is greater than viewBottom, at any point where a portion of the frame is located in the viewport (e.g., where frameTop is greater than viewBottom through when frameBottom is less than viewTop).

FIG. 21 illustrates a number of frames positioned within and without the viewport, according to an example of the principles described herein. The positions of the frames may be referred to as states. Activation of each state may affect the attributes of a component within the visualization, the frames, and/or any other portion. The different states of a frame as the viewport is scrolled past the frame are depicted in FIG. 21. A first state is when the frame is outside the viewport and about to enter the viewport (e.g., where viewBottom is greater than frameTop). A second state is when the frame is within the viewport (e.g., when frameTop is greater than viewBottom through when frameBottom is less than viewTop). A third state is when the frame is outside the viewport and has fully exited the viewport (e.g., where viewTop is greater than frameBottom). The first and third states may be referred to as out-of-view states and may be further defined as an "about-to-enter" out-of-view state and an "about-to-exit" out-of-view state. Further, each frame may have additional states that define a degree or percentage of what portion of the frame is in-view and what portion of the frame is out-of-view. For example, a frame may be 10% out-of-view, 30% out-of-view, 60% out-of-view, etc. as either entering or exiting the viewport. These custom frame points may be set to define an action to be taken as to the visualization and the attributes of the components of the visualization.

FIG. 22 illustrates a number of frames positioned within and without the viewport, according to an example of the principles described herein. More specifically, FIG. 22 depicts a situation where two states are true at the same time. Because each frame and the state of each frame affects the attributes of the components of the visualization, when two states overlap with one another, this may affect the visualization in instances where the two separate frames are defined to affect the same attributes of the same component.

Figure 23:
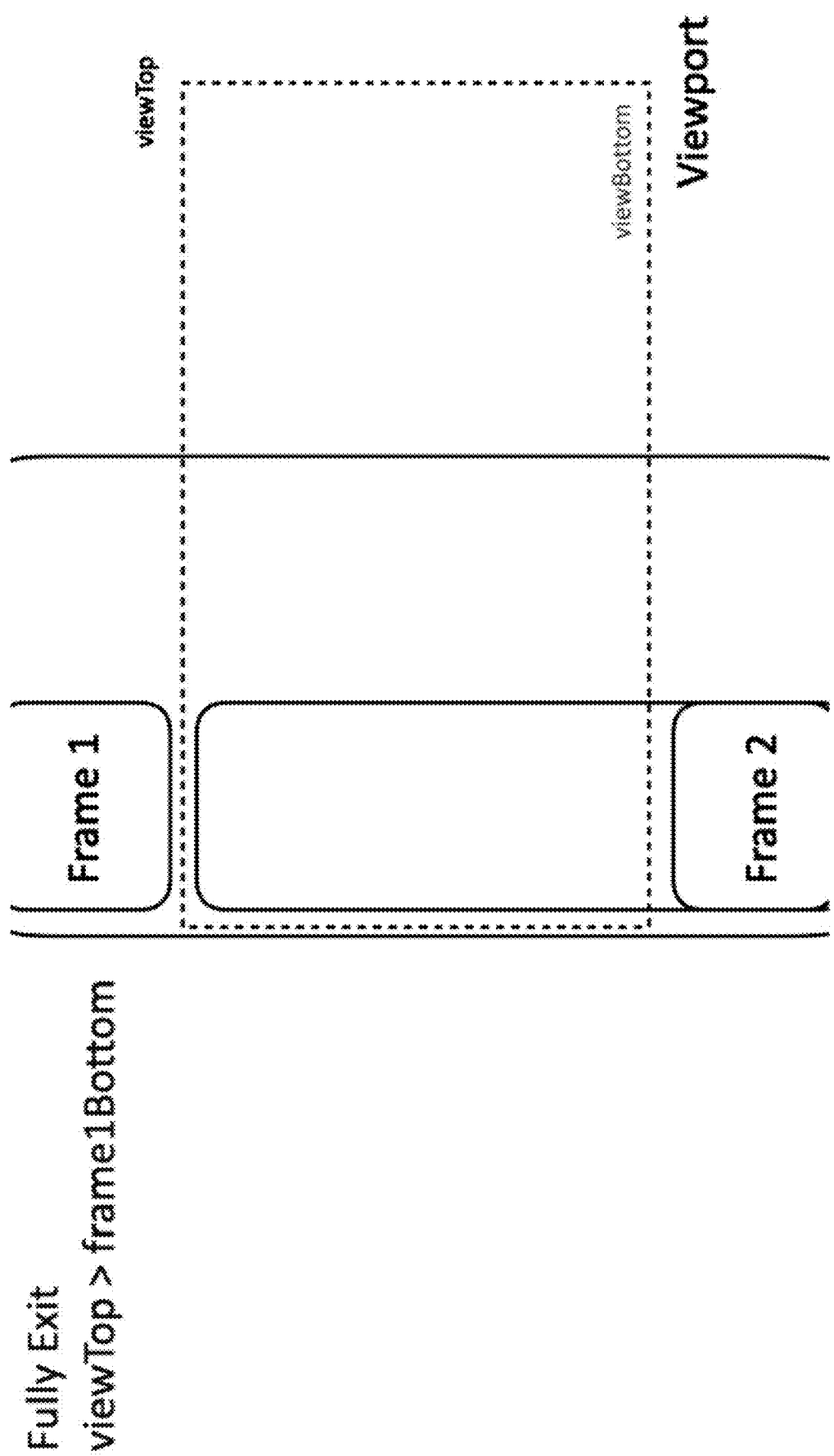
FIG. 23 illustrates a number of default states of frames, according to an example of the principles described herein.

FIG. 23 illustrates a number of default states of frames, according to an example of the principles described herein. FIG. 23 depicts three default states of a frame including the first state where the frame is outside the viewport and about to enter the viewport (e.g., where viewBottom is greater than frameTop), the second state where the frame is within the viewport (e.g., where frameTop is greater than viewBottom through when frameBottom is less than viewTop), and the third state where the frame is outside the viewport and has fully exited the viewport (e.g., where viewTop is greater than frameBottom).

Figure 24:
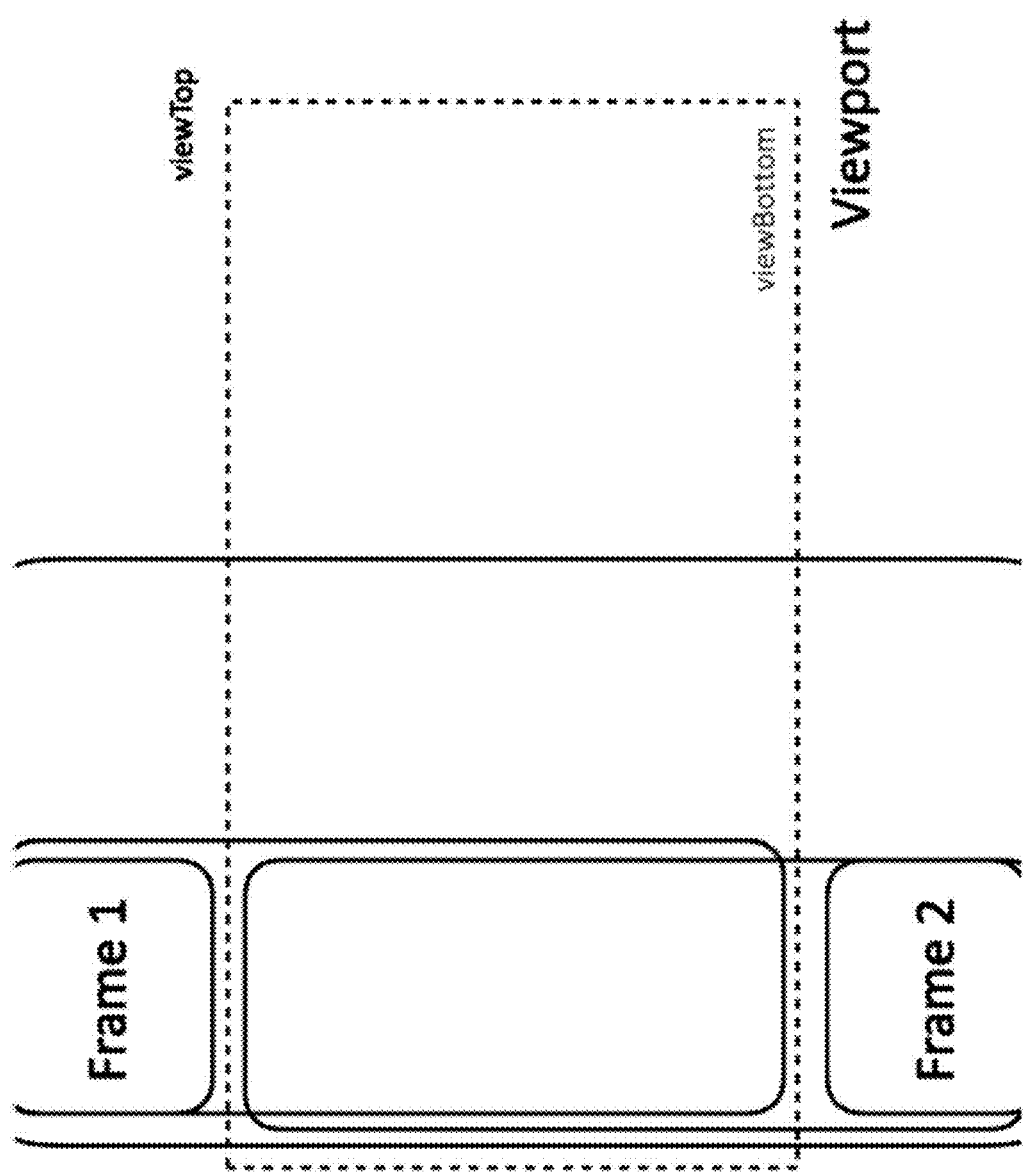
FIGS. 24 through 26 illustrate a scenario where Frame 1 is fully exited from the viewport and Frame 2 is about to enter the viewport, according to an example of the principles described herein.
Figure 25:
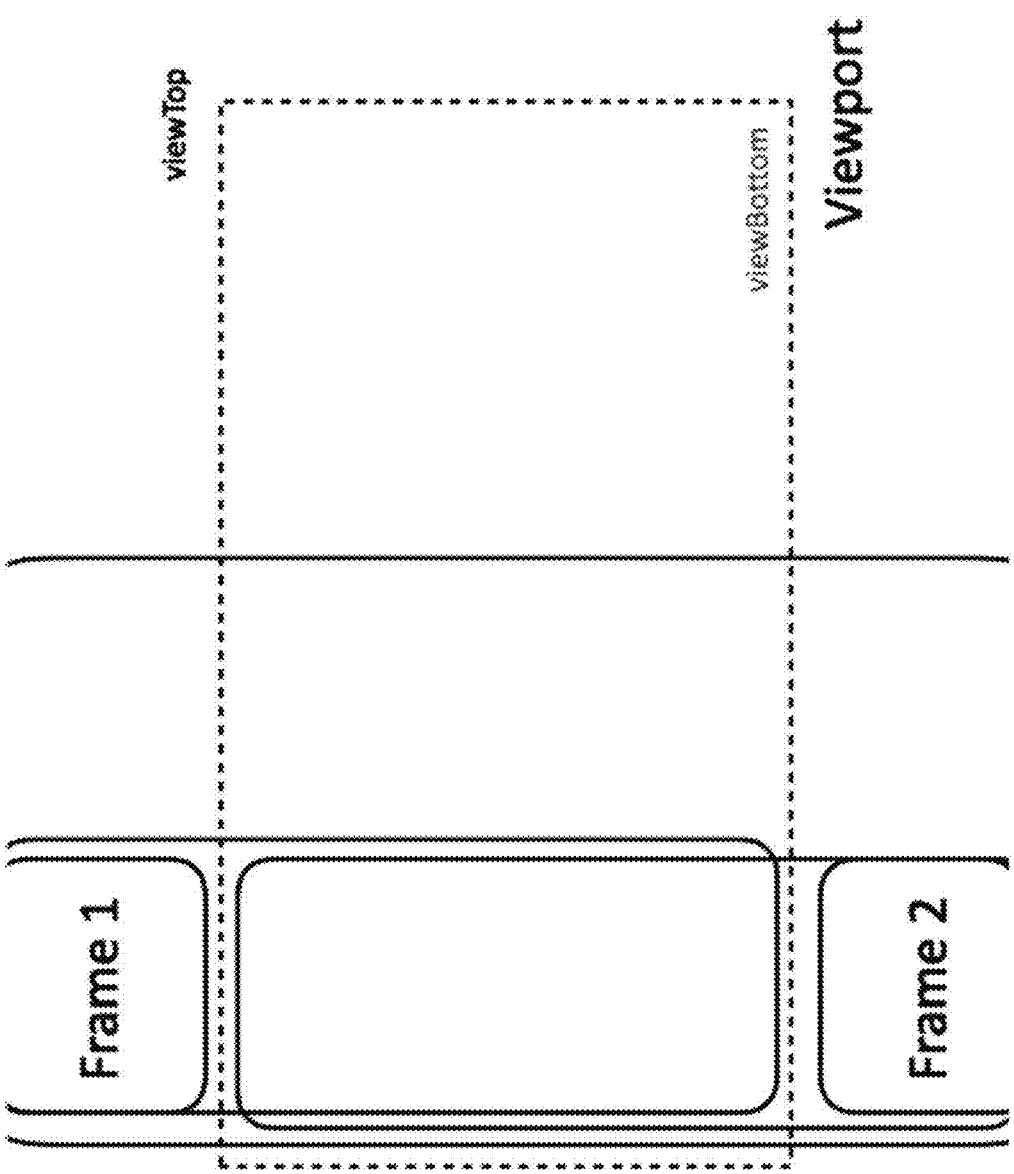
Figure 26:
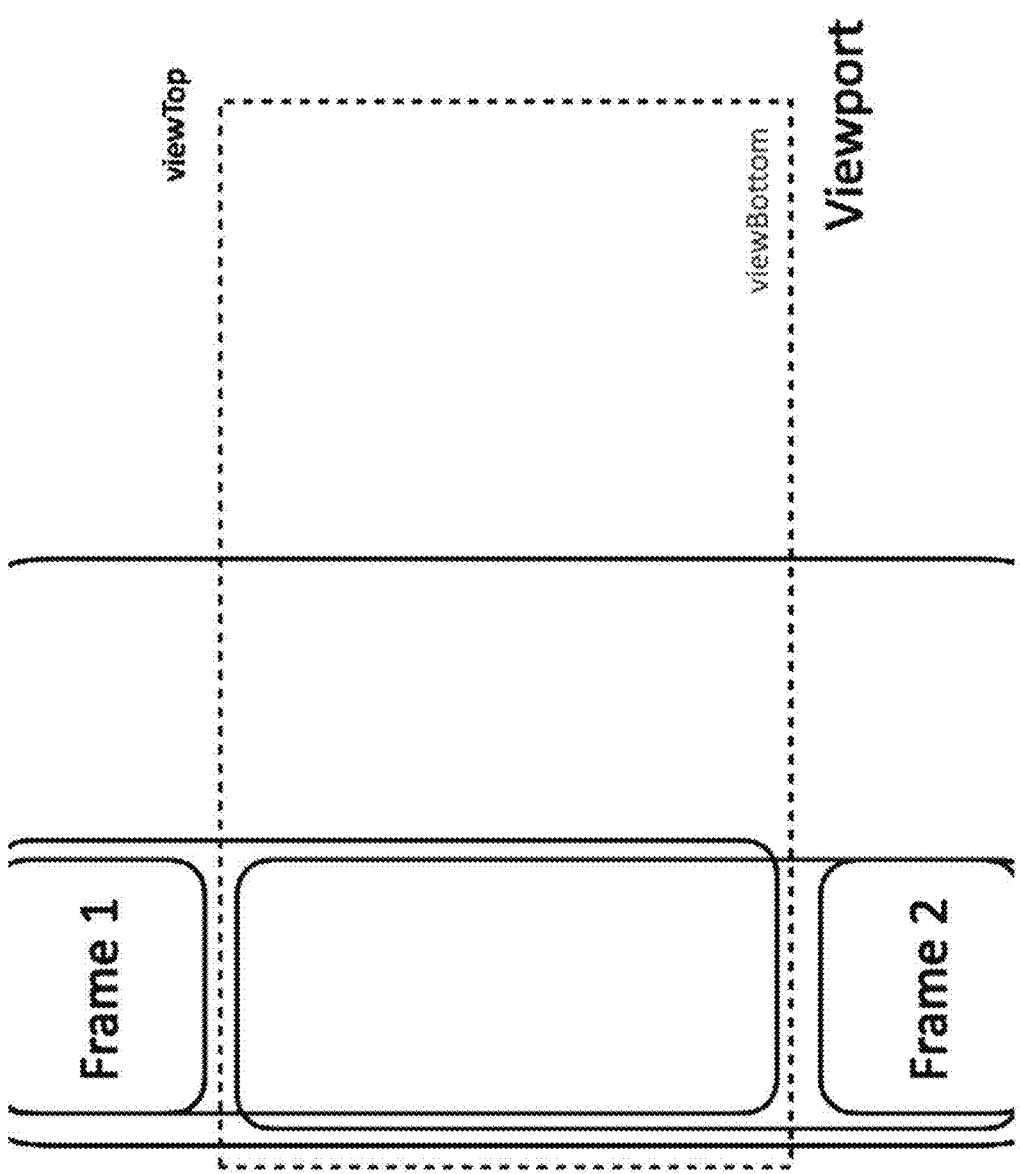

FIGS. 24 through 26 illustrate a scenario where Frame 1 is fully exited from the viewport and Frame 2 is about to enter the viewport, according to an example of the principles described herein. Assuming in this scenario that Frame 1 and Frame 2 have definitions affecting the same attribute of the same component within the visualization, it may be determined which frame the computing device and its algorithm should prioritize for or select as the controlling frame. In terms of computer science languages, the conditions may overlap with the scope of another condition.

Figure 27:
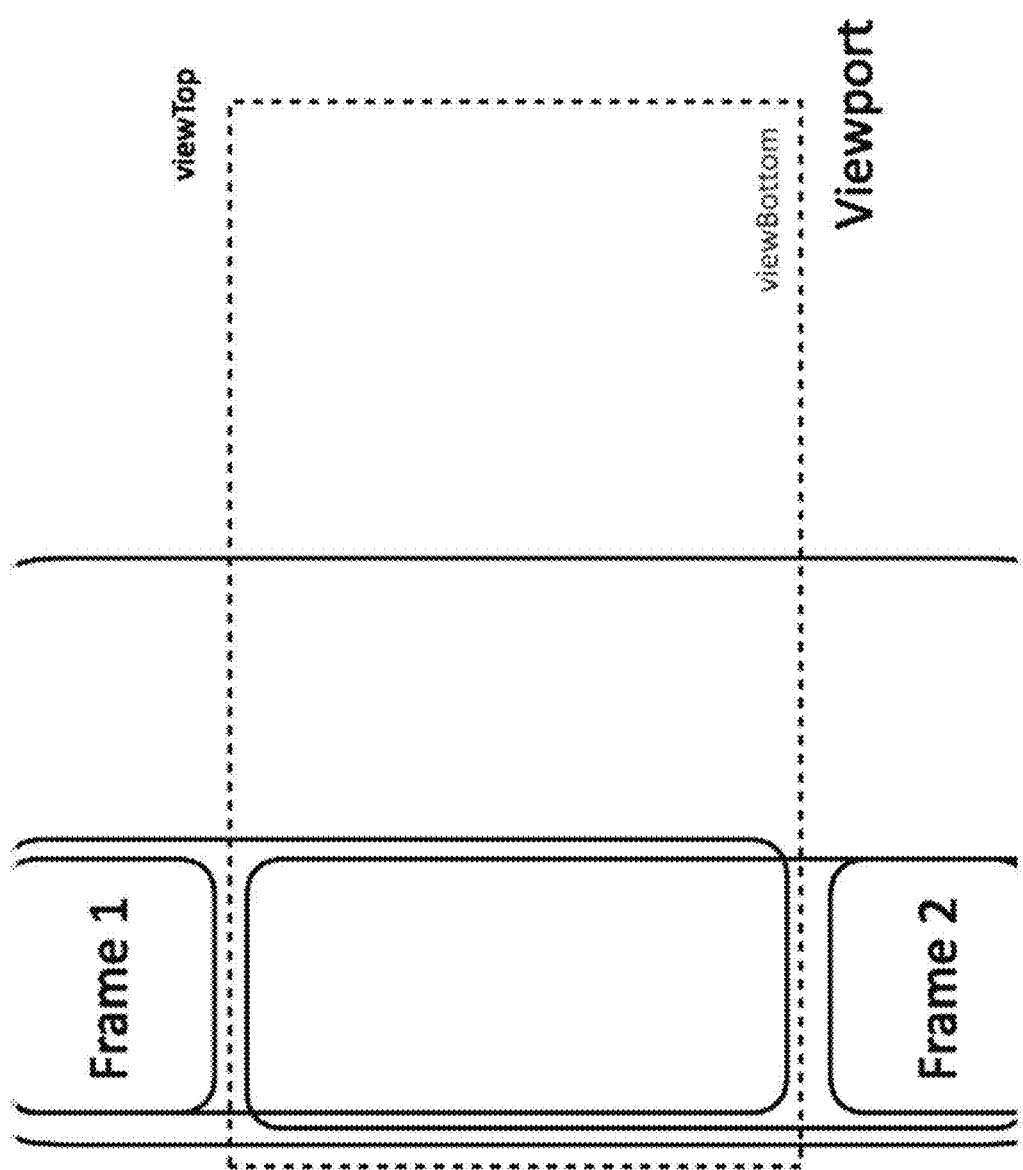
FIG. 27 illustrates a constraint placed on frames to address overlapping conditions, according to an example of the principles described herein.

FIG. 27 provides a solution to overlapping conditions. FIG. 27 illustrates a constraint placed on frames to address overlapping conditions, according to an example of the principles described herein. FIG. 27 depicts the solution to FIGS. 24 through 26 where Frame 1 is fully exited from the viewport and Frame 2 is about to enter the viewport, and assuming in this scenario that Frame 1 and Frame 2 have definitions affecting the same attribute of the same component within the visualization. Here, the solution is to add another constraint where viewTop is greater than frame1Bottom and viewBottom is less than frame2Top and removing the constraint of viewBottom being less than frame2Top. Thus, in this manner, after frame 1 exits the viewport, and before frame 2 enters the viewport, the conditions prioritize for allowing frame 1 to exit first before the conditions associated with frame 2 are executed. Stated another way, control over conflicting attributes of the same component is defined by the exit state of a previous frame where the enter state of a next frame is defined by the exit state of a previous frame. The hand-over from Frame 1 to Frame 2 may be configured to occur when any percentage of Frame 1 and Frame 2 are visible in the viewport. Further, changes defined by a frame may be made to the visualization (e.g., the attributes of the components) based on the percentage of the frame that is visible in the viewport. Thus, as the frame enters and/or exits the viewport, the frame may still affect the changes to the visualization such as drawings lines or curves, changing colors of components, etc.

Student and Educator Interaction

Figure 28:
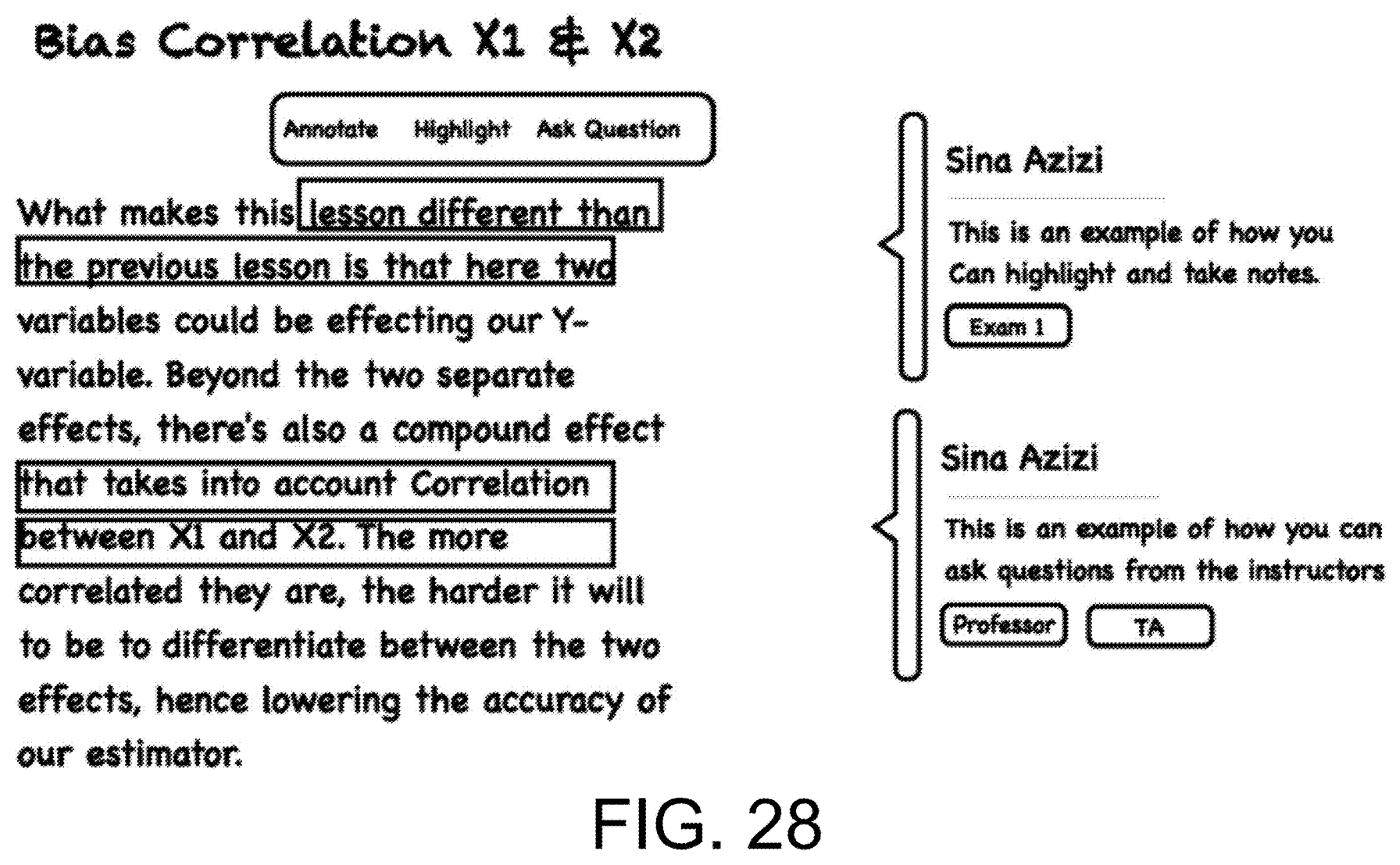

As mentioned above, participants such as students and educators such as teachers or professors may desire to interact with one another both during the presentation (e.g., during a lecture or class) and outside of the class or lecture. FIG. 28 illustrates an interactive instance, according to an example of the principles described herein. FIG. 28 depicts a manner in which a participant may interact with the presenter through annotations, highlighting, asking questions, etc. as described above. As indicated in FIG. 28, highlighting or other forms of emphasis made in the text portions of the presentation may be made by the student or educator. In FIG. 28, such annotations are designated by boxes around certain text. Further, communications between a student "Sina Azizi" and the educator (e.g., a professor or teaching assistant (TA)) may also be presented. When presented, the communication may be presented to the educator during the presentation or thereafter so that the educator may respond thereto. The student may designate to whom the communication should be directed such as to a professor or a TA by selecting a button associated with the communication. As depicted in FIG. 28, the communication may be presented in the form of a text message or chat message. In this manner, the presentation may be made more interactive resulting in an increase in learning.

In the example of FIG. 28, the question is tied to a specific portion of the presentation as defined by the point at which the participant selects text from a frame and begins the questioning phase. The presenter may be made aware that the participant selected a portion from the "Bias Correlation X1 & X2" portion of the presentation, and, more specifically, the phrases "lesson different than the previous lesson is that here two" and "that takes into account Correlation between X1 and X2. The more." In one example, this information may be transmitted along with the question via the type of communication to the presenter or another individual (e.g. a teacher's assistant (TA), another student, etc.). In one example, this information may be presented within a link (e.g., HTML link) within the communication for the presenter to select. Once the presenter selects the link, the question is presented to the presenter within the presentation. In this manner, the presenter is made immediately aware of what portion of the lecture the participant has a question. In one example, the participant may define what individuals are allowed to view the question including the presenter, a TA, one or more students, other individuals, and combinations thereof defining participation of individuals within a forum created by the communicated question.

Any type of communication may be utilized to inform the presenter of the query from the student including email, short message service (SMS) (e.g., in the form of texts and/or chat communications), instant messaging, communication via social media platforms, among a myriad of other types of communication.

Figure 29:
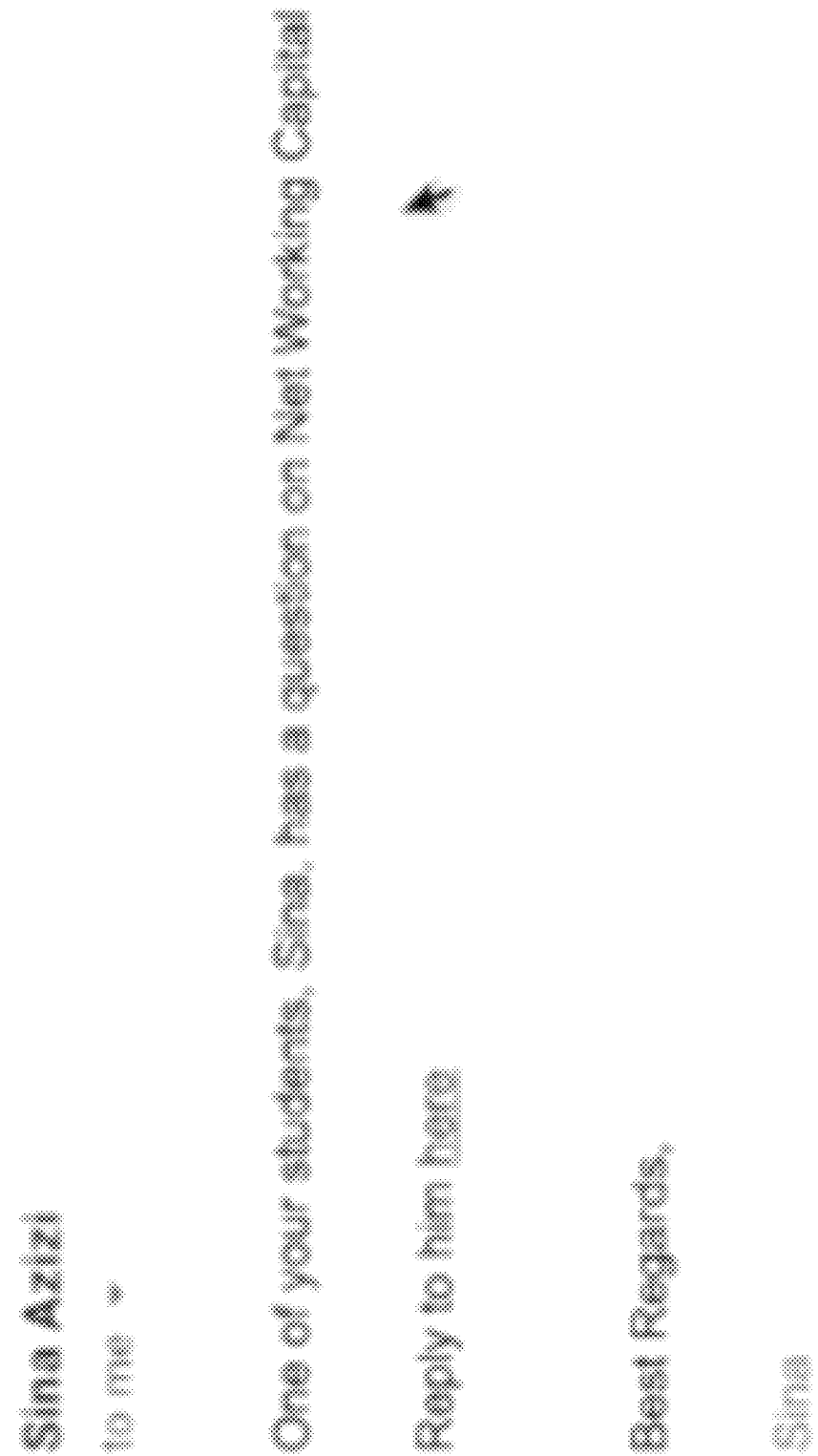
FIG. 29 illustrates an interactive communication, according to an example of the principles described herein.

FIG. 29 illustrates an interactive communication, according to an example of the principles described herein. Here, the student "Sina Azizi" has asked a question, and the presenter such as the educator may receive an alert presented in the form as depicted in FIG. 29. This alert indicates that a student has a question about a specific area of study within the presentation such as, for example, "Net Working Capital." An option is presented to the educator to reply through following the link associated with "Reply to him here." The educator may select the link under "here," and reply to the question. This provides the educator with the ability to immediately be aware of the portion within the presentation the student has the question and can, therefore, better reply with a relevant answer. Further, this may provide direction to the educator as to how the presentation may be prepared in a more efficient or understandable manner so that the educator may provide a higher level of education for the students.

Analytics Procurement, Processing, and Displaying

With the present systems and methods, a number of data may be procured, processed, and provided to the educator and/or the students to provide direction as to the effectiveness of the presentation. As mentioned above, a myriad of analytics data may be obtained during the participant's interaction with the presentation. The analytics data may be obtained during a live presentation by the presenter and/or during an offline instance where the participant is reviewing or studying the material within the presentation during a time when the presenter is not presenting the presentation. A computing device associated with the execution of computer readable code of the presentation or any other computing device capable of tracking user-interactions with the presentation may obtain a number of analytics data. The analytics data may be used, in turn, to determine the effectiveness of the presentation as to the understanding of the topic(s) taught via the presentation. Further, the analytics data may be used to identify specific topics or subtopics the participant may or may not have fully understood. Knowing this data allows for better presentations to be prepared in the future and for participants and/or presenters to assist in the learning of the topics and subtopics.

The types of knowledge-based elements of the presentation may include, for example, a course, a semester, a trimester, a term, a class, a lecture, a topic, a subtopic, learning objectives, and individual frames, among other types of knowledge-based elements of the presentation. Learning objectives may be defined as any number of frames grouped together to teach a topic, subtopic, and/or concept. A learning objective may be classified as a prerequisite of a second learning objective.

The inputs and/or interactions of participants (e.g., students, etc.) and the presenter (e.g., professor, teacher, TA, etc.) may be tracked, identified, and stored as analytics data. Thus, the associated computing device may include a data storage device such as analytics database.

As to participant inputs, a degree of effort spent learning from the presentation may be tracked, identified, and stored as the analytics data. The number of sessions spent by the participant, the time spent in each session, an average duration of each session, time between sessions, time spent at each frame of the presentation (which may indicate a level of understanding of the topic or an indication of failed understanding due to a relatively shorter duration of time spent at one or more frames), idle versus engaged time tracking based on user inputs detected within the frames, time spent within a learning objective, notes taken in the frames, questions asked and answered by the participant, exam or test performance, among a myriad of different metrics that may be obtained from the participant's inputs.

The metrics may include metrics defining effort spent learning. Effort spent learning may be measured by a number of metrics including, for example, the number of sessions the participant participates in. The sessions may be broadly defined as any separate and individual instances of interaction with the presentation. In one example, a session may include an entirety of a lecture or a portion thereof. A total amount of time spent during each session as well as an average time spent for a plurality of sessions may be included as metrics. Further, time spent between sessions may also be included as metrics for the analytics data.

Idle time and engaged time of the user may be tracked as analytics data to determine time spent by the user within a session. Idle time tracking tracks the user's time for when they are on a page but nothing has moved (scroll position or mouse position, for more than a first predetermined duration of time (e.g., 3 minutes)). Engaged time is when the mouse/scroll position has changed at least once within a second predetermined duration of time (e.g., within the past 60 seconds). When the scroll/mouse position has not changed within the second predetermined duration of time (e.g., with the last 60 seconds), but has not been more than the first predetermined duration (e.g., within 3 minutes), the user's level of engagement may not be determined or determinable.

Another metric that defines the analytics data may include time spent with a learning objective. In one example, the time spent with a learning objective may be a cumulative duration of time spent on a number of frames associated with the learning objective. In one example, the time spent with a learning objective may include time spent on each frame over a period of time.

Student inputs used as analytics data may also include note taking. The executable code described herein allows for the user to take notes using a number of different types of note taking within the text of the frame, and may include, for example, a number of words highlighted, a number of annotations/highlights made, a number of tags created in association with the text of the frames, other forms of note taking, and combinations thereof. These annotations may also be collected and identified as analytic data.

Student inputs used as analytics data may also include questions presented and answered by users. For example, the number of questions asked by the user may form part of the analytics. As to the questions asked by the user, the numbers of "likes" given for the question and the number of questions solved and unsolved may also be used as analytics data. Further, the number of questions the user replies to, likes, and/or replied to and solved may also serve as analytics data.

Student inputs used as analytics data may also include practice activities preformed by the user. For each question presented to the user, the analytics data may include data defining whether the user attempted the question(s), whether the user answered the question correctly on a first attempt, time spent on the question(s) overall, time taken by the user before they obtain a correct solution, and the number of attempts before obtaining a correct solution, and other metrics associated with the questions. The analytics data may also include whether other individuals (e.g., other students, etc.) offer feedback appertaining to the practice activities. For each question, the analytics data may include which of the learning objectives are most problematic for each question, and which questions the user finds difficult. Further, for each practice activity, it may be determined whether the user has a firm grip over the learning objectives of the practice activity.

Still further, based on each practice question, the aggregate of correctly answered questions plus the average for the entire practice may be considered. In this example, the time spent on the entire practice, the percent of questions attempted, the percent of questions correctly answered on the first try, time spent before looking at the solution, and/or number of attempts before looking at the solution may be considered.

Student inputs used as analytics data may also include exam performance by the user. The analytics data may include, for example, how many sessions and/or time spent on practicing before an exam, an average grade for each learning objective, and an average grade for the entire exam, among other exam performance related metrics.

Presenter inputs (e.g., inputs from a professor, a teacher's assistant (TA), etc.) may also be provided using the present systems and methods. As to participants' efforts identified by the presents systems and methods and provided to the presenter may include, for example, highlighted words, a number of questions answered, time spent on grading, time spent on making courses, time spent on answering questions/chats, and other metrics.

Student feedback to the professor may also be included as presenter inputs. The student feedback may include a number of students who find the class difficult, a number of students who would take the course again and/or recommend the course, a difference between grades expected by the participants and an actual grade received (e.g., "What grade do you expect in the class?" and the actual grade received), and additional questions that students can answer at the end of the course or class including the following:

TABLE 1

Example Feedback Questionnaire

PLEASE COMMENT ON THE FOLLOWING:

Fr
1. Your class level is
2. Your reason for taking this class is
3. What grade do you expect in this class?
GENERAL QUESTION S
D
4. I learned a great deal from this course.
5. How many hours a week do you spend studying outside of class on average?
6. How often do you attend this course?

TABLE 1-continued

Example Feedback Questionnaire

COURSE MATERIAL ECON 100B

S
D
7. The course material is intellectually stimulating.
8. Assignments promote learning.
9. Required reading is useful.
10. This course is difficult relative to others
11. Exams are representative of the course material.
12. Do you recommend this course overall?

The inputs may also include professor feedback that is to be determined.

Student and Educator Interaction

The educator may prepare the presentation using the present systems and methods and may also edit the presentation as feedback including the analytic data described above is known. FIG. 30 illustrates a presentation creation instance, according to an example of the principles described herein. FIG. 30 includes a number of frames within a presentation that may serve as the outline for the presentation. Further, FIG. 31 illustrates a presentation creation instance, according to an example of the principles described herein. FIG. 30 depicts a learning objective within the presentation. The learning objective may include any number of frames grouped together to teach a topic, subtopic, and/or concept.

Figure 32:
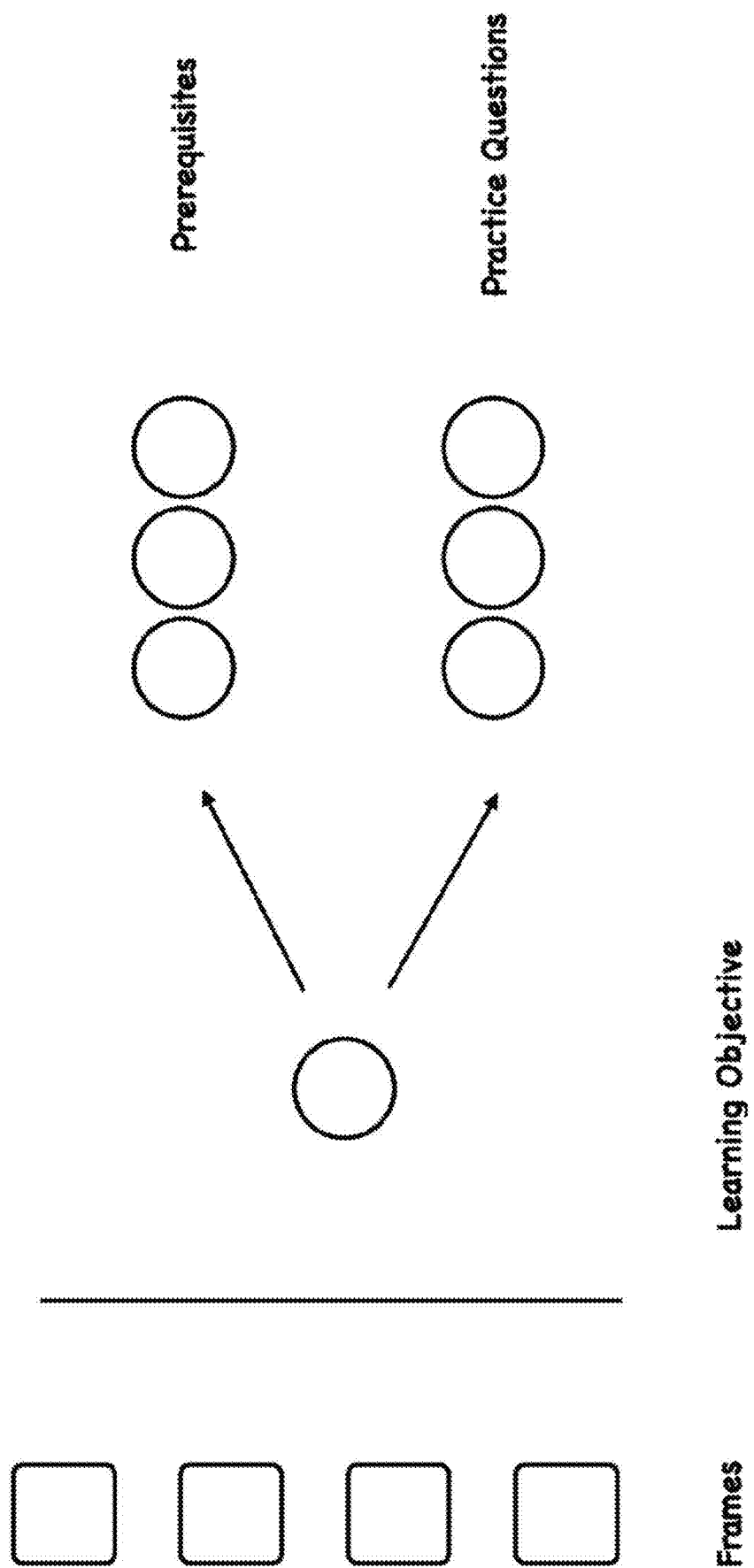
FIG. 32 illustrates a presentation creation instance, according to an example of the principles described herein.

FIG. 32 illustrates a presentation creation instance, according to an example of the principles described herein. FIG. 32 depicts a content graph of a learning objective and a number of prerequisites and questions associated with the learning objective. A learning objective may be classified as a prerequisite to a second learning objective. Thus, the prerequisites depicted in FIG. 32 may be prerequisite learning objectives that may be consumed and understood before the learning objective depicted in FIG. 32 is presented to the participant and/or by the presenter. In one example, a learning objective within a presentation that includes the most dependent learning objectives or prerequisite learning objectives (e.g., includes the most edges coming out if it) may be referred to as a "keystone" learning objective. Any prerequisite may be required to be understood by the participant before moving onto a subsequent learning objective. A presentation may include any number of keystone learning objectives, any number of learning objectives in total, and any number of layers of requisite learning objectives. Keystone learning objectives must be understood by the participant because the participant may not fully understand dependent learning objectives. Further, learning objectives may be referenced in practice and exam questions. Because most exams or tests incorporate a plurality of learning objectives, the learning objectives should be understood in an independent/dependent order to fully understand the overall topic encompassing the learning objectives. Thus, it is much easier to reference learning objectives as opposed to individual frames within the presentation.

Figure 33:
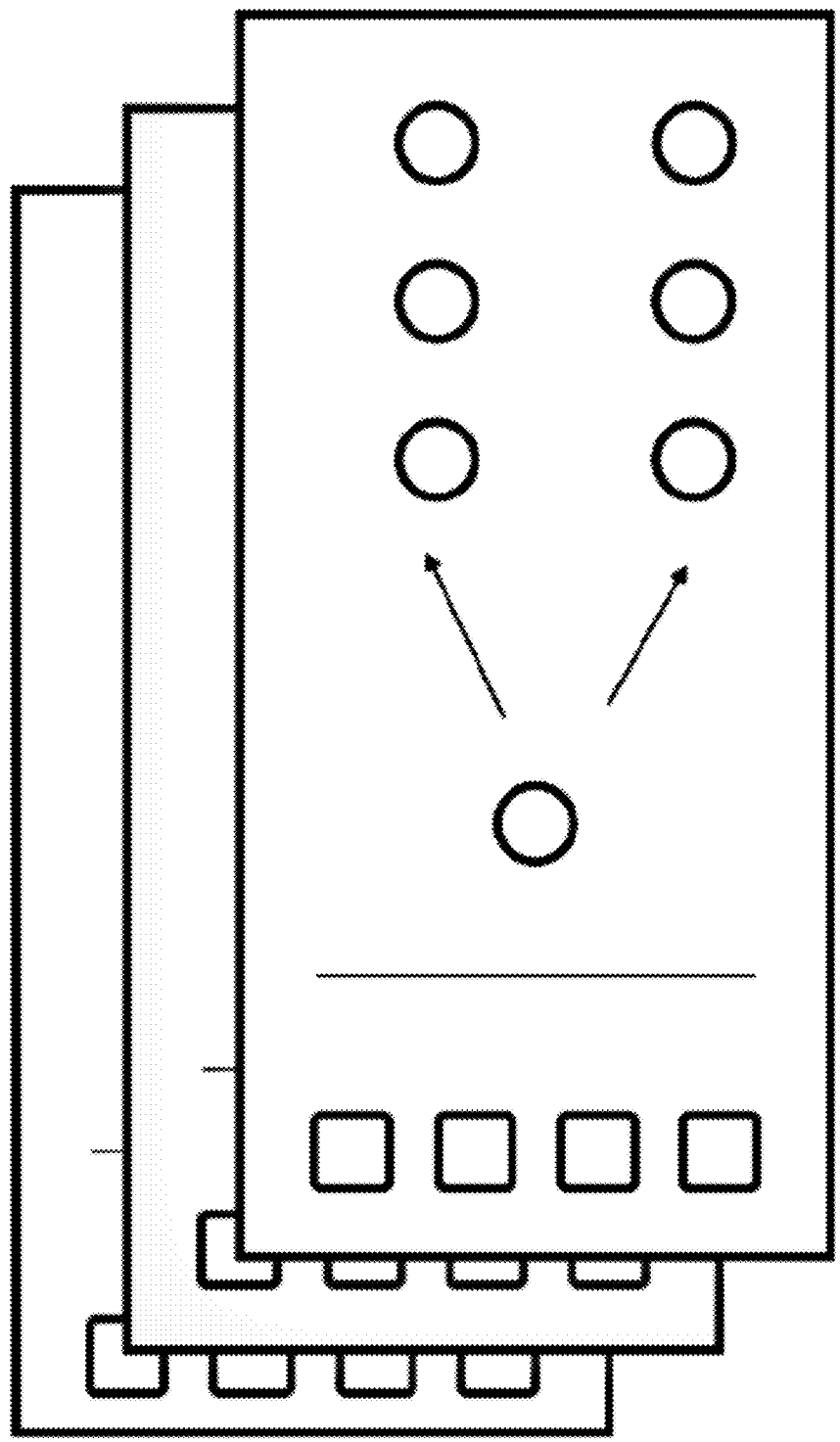
FIG. 33 illustrates a presentation creation instance, according to an example of the principles described herein.

FIG. 33 illustrates a presentation creation instance, according to an example of the principles described herein. FIG. 33 depicts a content graph of a lecture or lesson presented in the presentation. The lecture may include a plurality of sets of learning objectives, and prerequisites and questions associated with the learning objective.

FIG. 34 illustrates a presentation creation instance, according to an example of the principles described herein. FIG. 34 depicts a content diagram of a number of lectures and a number of prerequisite lectures. Just as a number of learning objectives may have prerequisites, so too may an entire lecture have a number of prerequisite lectures.

Figure 35:
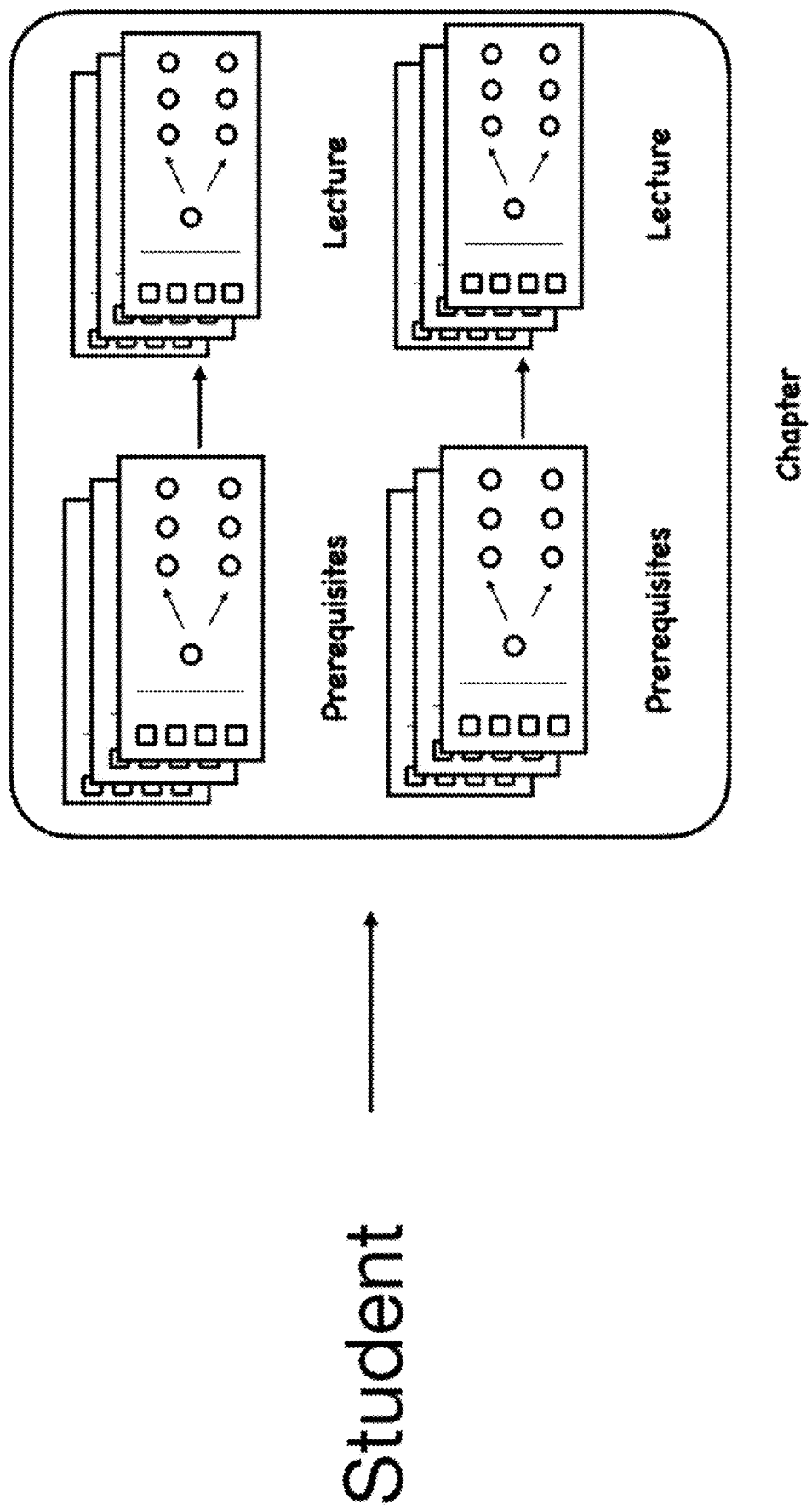
FIG. 35 illustrates a presentation creation instance, according to an example of the principles described herein.

FIG. 35 illustrates a presentation creation instance, according to an example of the principles described herein. FIG. 35 depicts a content diagram of a chapter including a number of lectures and a number of prerequisite lectures with their respective learning objectives, prerequisites, and questions. The content graphs described herein and their relation to their respective courses (a number of chapters), chapters, lectures, learning objectives, and prerequisites and questions associated with the learning objectives may be stored in a database and associated with the presentation.

Figure 36:
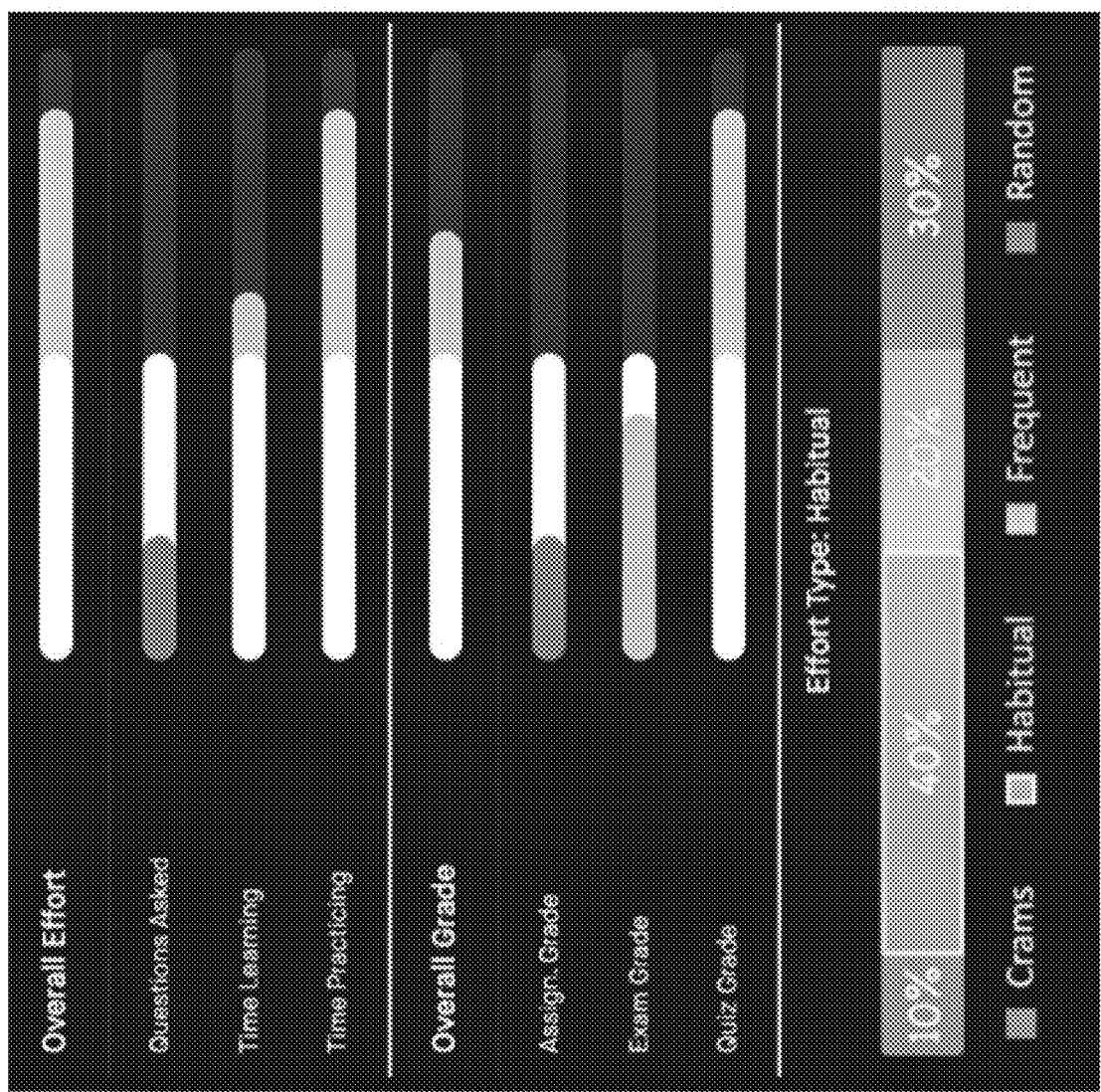
FIG. 36 illustrates a number of metrics, according to an example of the principles described herein.

FIG. 36 illustrates a number of metrics, according to an example of the principles described herein. More specifically, FIG. 36 depicts effort metrics associated with a user's interaction with the chapters, lectures, learning objectives, and prerequisites and questions associated with the learning objectives may be stored in a database and associated with the presentation. Effort may be measured by an overall effort metric ("Overall Effort") that may be determined based on a number of questions asked, time or duration spent learning, and time practicing (performing practice tests, quizzes, etc.), among a myriad of other metrics described herein. Performance-related metrics may also be obtained from the user's performance in answering questions during the lecture(s), quizzes, and exams, and may include an overall grade ("Overall Grade"), assignment grades, exam grades, and quiz grades, etc. Still further, the systems and methods described herein may also define a number of types of effort applied by the user such as cramming efforts, habitual efforts, frequent efforts, and random efforts, among other types of effort exerted by the user. These types of efforts may be based on time spent in studying using the presentation, proximity to deadlines associated with events like assignments, quizzes, and exams, and other effort-based metrics described herein. The types of efforts applied by the user may be displayed in a proportionality chart such as a bar graph, a pie chart, etc.

The effort metrics of FIG. 36 may also include composite data displayed to a user defining analytics associated with the efforts and outcomes of the user's performance in understanding the learning objectives. The types of effort as depicted in FIG. 36 may be defined based on time-stamps when the user is spending time on a frame and how long at that frame. For example, a time stamp defining time interval 11:12:13 to 11:12:14 at Frame 128 may define how much time the user is spending at Frame 128 within the lecture. Time spent at a next frame such as Frame 129 may be from 11:12:14 to 11:12:15.

Figure 37:
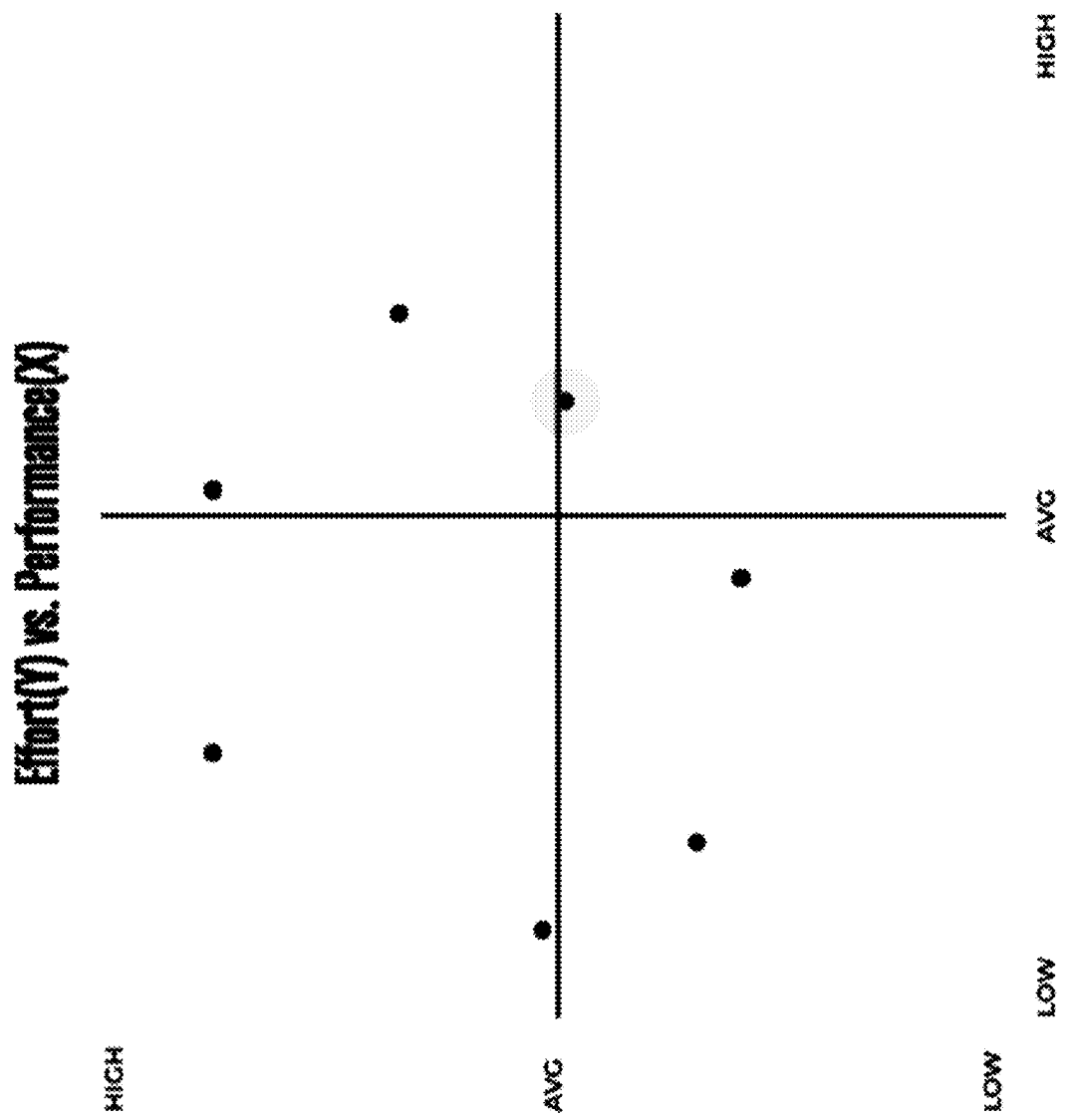
FIG. 37 illustrates an effort versus performance chart, according to an example of the principles described herein.

FIG. 37 illustrates an effort versus performance chart, according to an example of the principles described herein. The effort versus performance chart of FIG. 37 may include effort variables and performance variables. The four quadrants of the effort versus performance grid may define low effort and low performance in the bottom left quadrant, low effort and high performance in the bottom right quadrant, high effort and low performance in the upper left quadrant, and high effort and high performance in the upper right quadrant. In one example, the dots within the effort versus performance grid may indicate an outcome of an exam or quiz or some other educational assessment intended to measure a specific user's knowledge, skill, aptitude, etc. as to the learning objectives. In another example, the dots within the effort versus performance grid may indicate the overall performance of a plurality of users (e.g., students) where each dot indicates an individual's performance.

Figure 38:
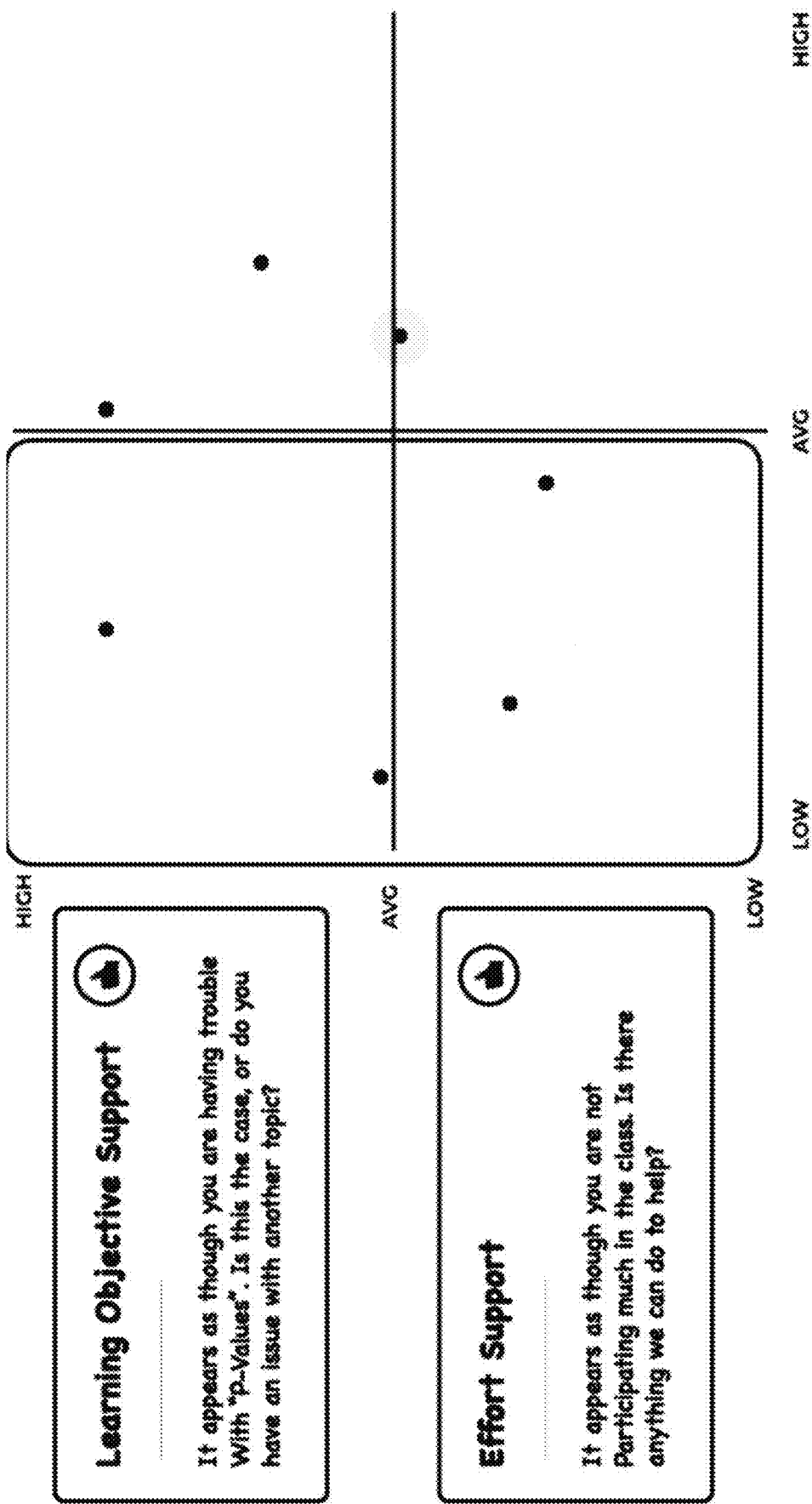
FIG. 38 illustrates an effort versus performance chart, according to an example of the principles described herein.

FIG. 38 illustrates an effort versus performance chart, according to an example of the principles described herein. FIG. 38 depicts the effort versus performance grid where the effort variables and performance variables that indicate low effort and high effort along with low performance are highlighted (e.g., via a box superimposed on the chart). In one example where a lack of effort is detected, a number of messages may be sent to the user to assist the user in obtaining results that include outcomes in the high or low effort and high results quadrants. For example, those students' whose performance indicates low effort and/or low performance may be sent an automated message via the types of communications described herein indicating where the individual student is underperforming or is seen to be lacking in effort and may identify specific chapters, lectures, learning objectives, and/or prerequisites and questions associated with the learning objectives in the communication. In this manner, the granularity of the understanding of the topics being taught may be understood by the users (e.g., students and teachers) alike. In one example, the presenter (e.g., the teacher, professor, TA, etc.) may be provided the information within the effort versus performance grid to allow the presenter to understand how their teaching may be improved and may be provided information as to what specific learning objectives each specific user (e.g., student) is having difficulty understanding. Further, the presenter (e.g., the teacher, professor, TA, etc.) may be provided a number of messages that may identify how to improve their teaching collectively or for each individual student.

Further, the identification of prerequisite learning objectives that may prove difficult for a user may be identified based on performance of the learning objectives. In this example, when a user is displaying difficulty in understanding the learning objectives, it may be as a result of a poor understanding of the prerequisite learning objective(s) including the keystone learning objective(s). Thus, this information may be conveyed to the users including the participant (e.g., the student, etc.) and the presenter (e.g., the professor, teacher, TA, etc.).

Figure 39:
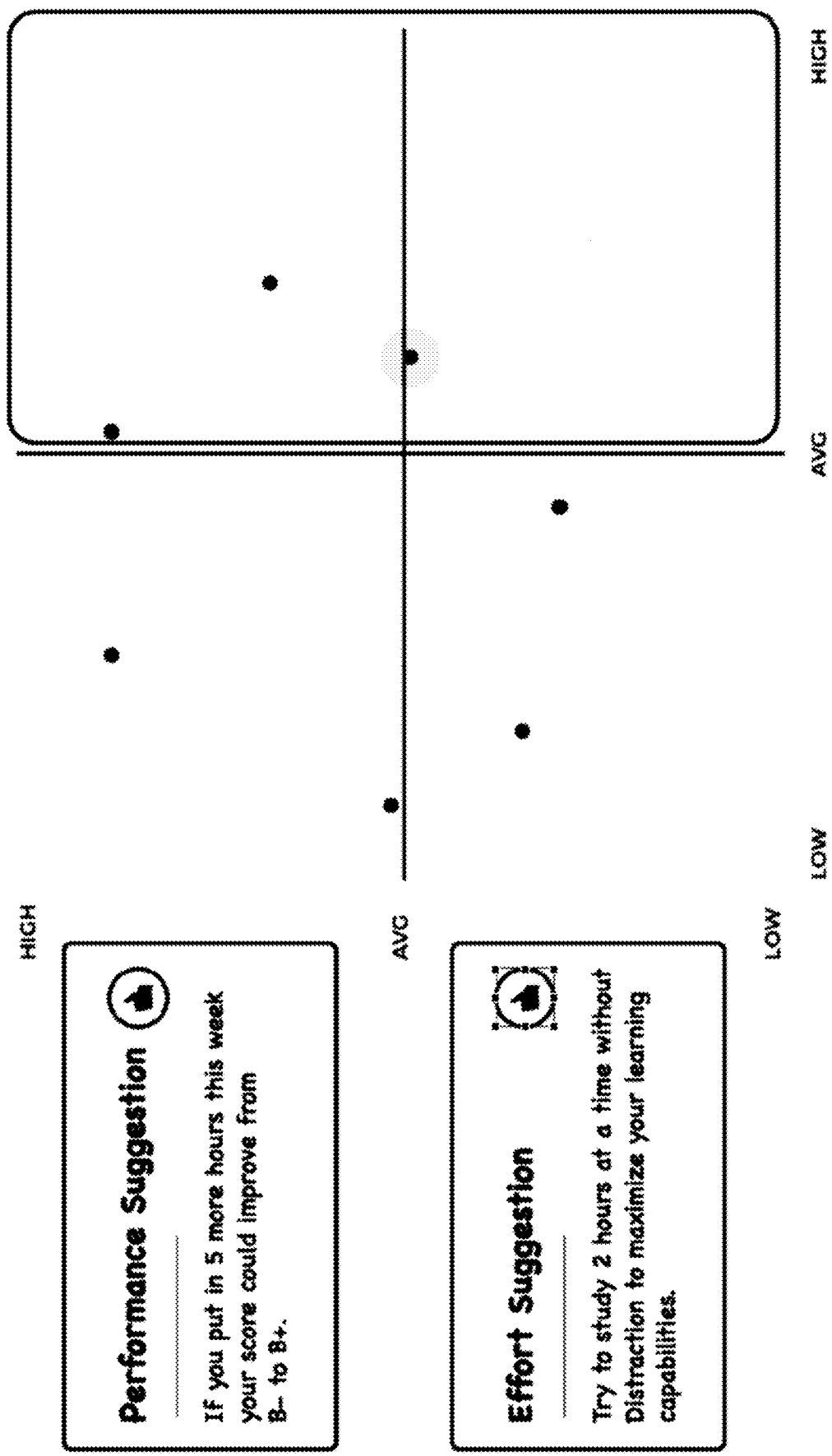
FIG. 39 illustrates an effort versus performance chart, according to an example of the principles described herein.

FIG. 39 illustrates an effort versus performance chart, according to an example of the principles described herein. FIG. 39 depicts the effort versus performance grid where the effort variables and performance variables that indicate low effort and high effort along with high performance are highlighted (e.g., via a box superimposed on the chart). Data obtained from the examples of students in this category may be used to assist lower-performing students in learning what may be done to increase their performance scores. Further, a number of performance and effort suggestions may be provided to the student.

FIG. 40 illustrates performance and effort suggestions, according to an example of the principles described herein. FIG. 40 depicts a number of student suggestions and professor suggestions that may be autonomously created and sent to the students and professor, respectively. In the examples described herein, machine learning algorithms may be used in association with the analytics data obtained.

The systems and methods described herein may rely on one or more data maps, look-up tables, neural networks, algorithms, machine learning algorithms, and/or other components relating to the operating conditions and the operating environment of the system that may be stored in the memory. Each of the data maps noted above may include a collection of data in the form of tables, graphs, and/or equations to maximize the performance and efficiency of the system and its operation. Machine learning uses algorithms and statistical models to cause the present systems and methods to perform a specific task without continuous explicit instructions input. Here the specific task being learned is the processing of analytics data to obtain the output data and perform the processes described herein. The system may rely on patterns and inferences as to how to process the analytics data. A mathematical model may be built by the system based on training data obtained from, for example, previous instances of analytics data collection and implementation of the present systems and methods. This training data may serve as a basis for the system to determine how to predict or decide to perform the processes and provide the output described herein.

Figure 41:
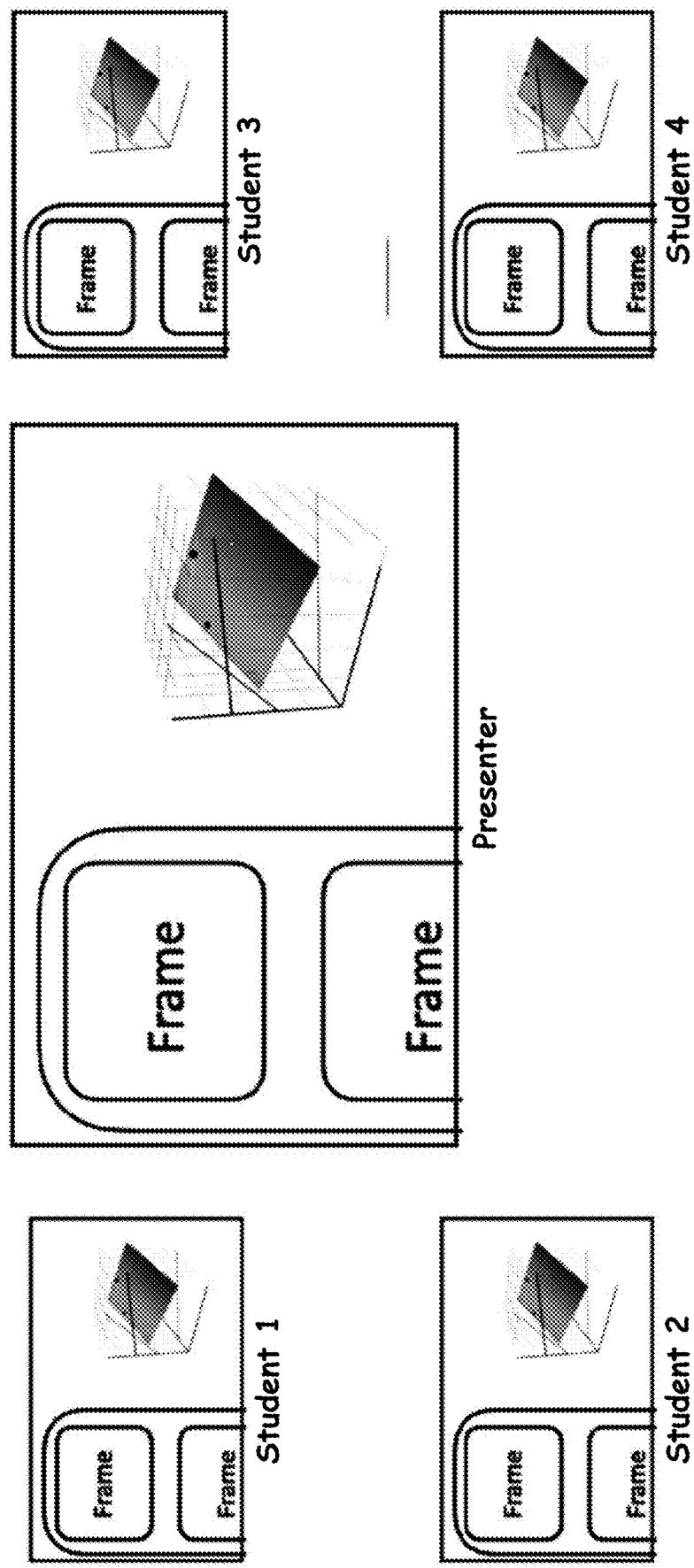
FIG. 41 illustrates synchronized viewports, according to an example of the principles described herein.
Figure 42:
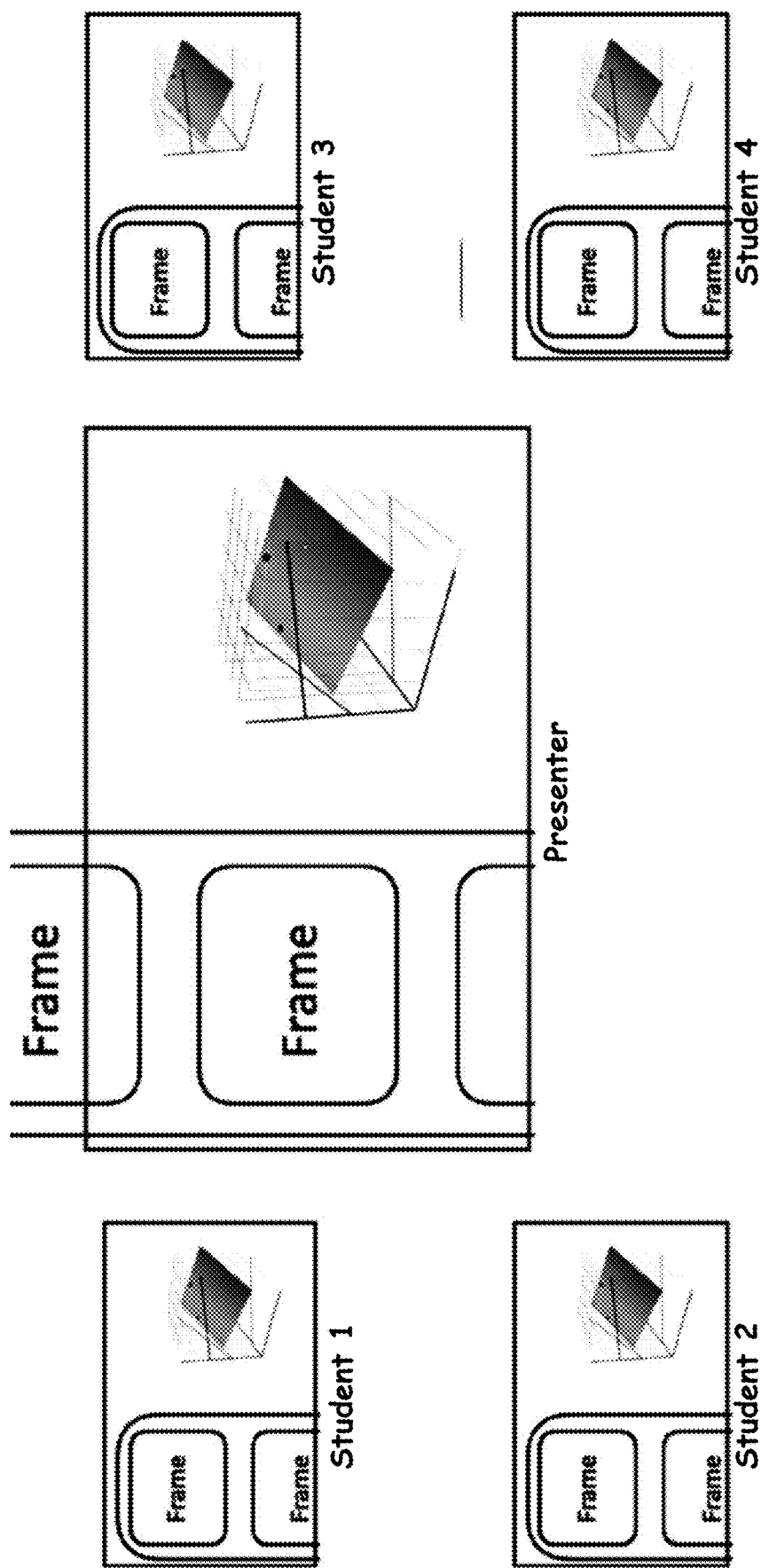
FIG. 42 illustrates synchronized viewports, according to an example of the principles described herein.

FIGS. 41 through 45 illustrate synchronized viewports, according to an example of the principles described herein. More specifically, FIG. 41 depicts synchronization of participants' various viewports. As the presentation is executed, the participant's viewports may be synchronized to the presenter's viewport. FIG. 42 depicts synchronization of participants' various viewports. As the presentation is executed, the participant's viewports may be synchronized to the presenter's viewport as the presenter scrolls through the frames.

Figure 43:
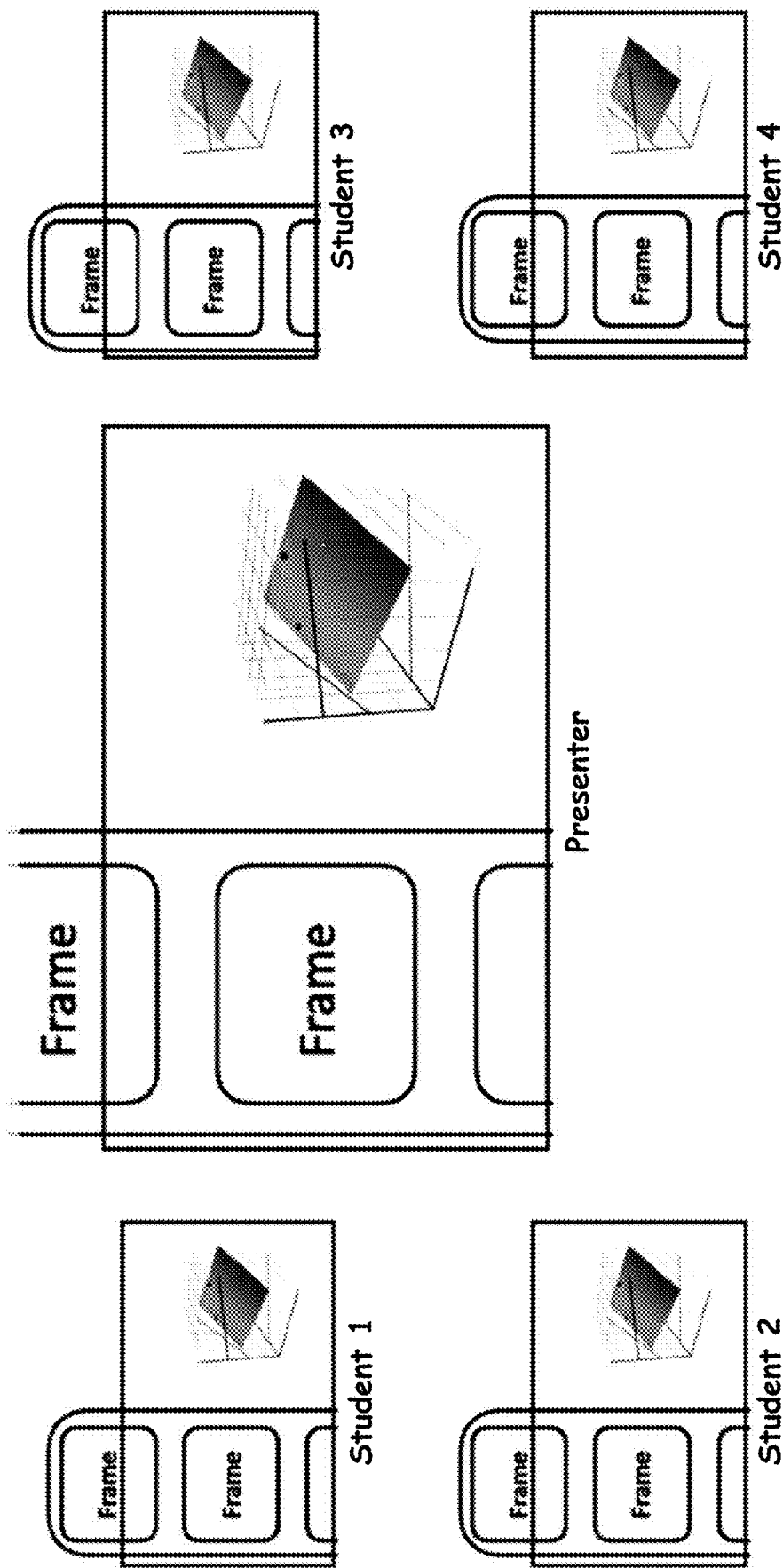
FIG. 43 illustrates synchronized viewports, according to an example of the principles described herein.

Similarly, FIG. 43 depicts synchronization of participants' various viewports such that as the presentation is executed, the participant's viewports may be synchronized to the presenter's viewport as the presenter scrolls through the frames. As depicted in FIG. 43, the viewports of Student 1, Student 2, Student 3, and Student 4 are synchronized with the presenter's viewport so that the students are viewing the relevant portions of the presentation as the educator is teaching.

FIG. 44 depicts synchronization of participants' various viewports. As the presentation is executed, the participant's viewports may be synchronized to the presenter's viewport as the presenter scrolls through the frames. Student 1's viewport is not synchronized with the Presenter's viewport since Student 1 has moved either forward or backward in the frames.

FIG. 45 illustrates synchronized viewports, according to an example of the principles described herein. The participants (e.g., Student 1) may scroll through the various frames within the presentation without affecting the presenter's version within the presenter view. As the participant does this, a "return to live view" button may appear to allow the participant to return to the live lecture at the point within the presentation at which the presenter is currently lecturing from. In this manner, the participant may freely access and view past and future frames separate from the frame the presenter is currently discussing and displaying but may still move back to the portion of the presentation the presenter is currently discussing (e.g., lecturing on). Thus, selection of the "return to live view" button may return the participant back to the state of FIG. 41 where the viewport of the participant is synchronized with the presenter.

The present systems and methods may be implemented via a number of components of a client device according to an example of the principles described herein. The client device may include one or more hardware processor(s) configured to execute one or more stored instructions. The processor(s) may comprise one or more cores. Further, the client device may include one or more network interfaces configured to provide communications between the client device and other devices, such as devices associated with the system architecture described herein, including, for example, user computing devices, a network, servers, and/or other systems or devices associated with the client device and/or remote from the client device. The network interfaces may include devices configured to couple to personal area networks (PANs), wired and wireless local area networks (LANs), wired and wireless wide area networks (WANs), and so forth. For example, the network interfaces may include devices compatible with the client devices, and/or other systems or devices associated with the client device.

The client device may also include computer-readable media that stores various executable components (e.g., software-based components, firmware-based components, etc.). In one example, the computer-readable media may include, for example, working memory, random access memory (RAM), read only memory (ROM), and other forms of persistent, non-persistent, volatile, non-volatile, and other types of data storage. In addition to various components discussed herein, the computer-readable media 606 may further store components to implement functionality described herein. While not illustrated, the computer-readable media may store one or more operating systems utilized to control the operation of the one or more devices that comprise the client device. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the client device may include a data store which may comprise one, or multiple, repositories or other storage locations for persistently storing and managing collections of data such as databases, simple files, binary, and/or any other data. The data store may include one or more storage locations that may be managed by one or more database management systems. The data store may store, for example, application data defining computer-executable code utilized by the processor to execute the applications. Further, the application data may include data relating to the execution of the methods described herein, the analytics data obtained during the sessions, and other data that may be used by the applications to provide the outputs described herein. The computer-readable media may store portions, or components, of the applications that support the methods described herein.

Figure 46:
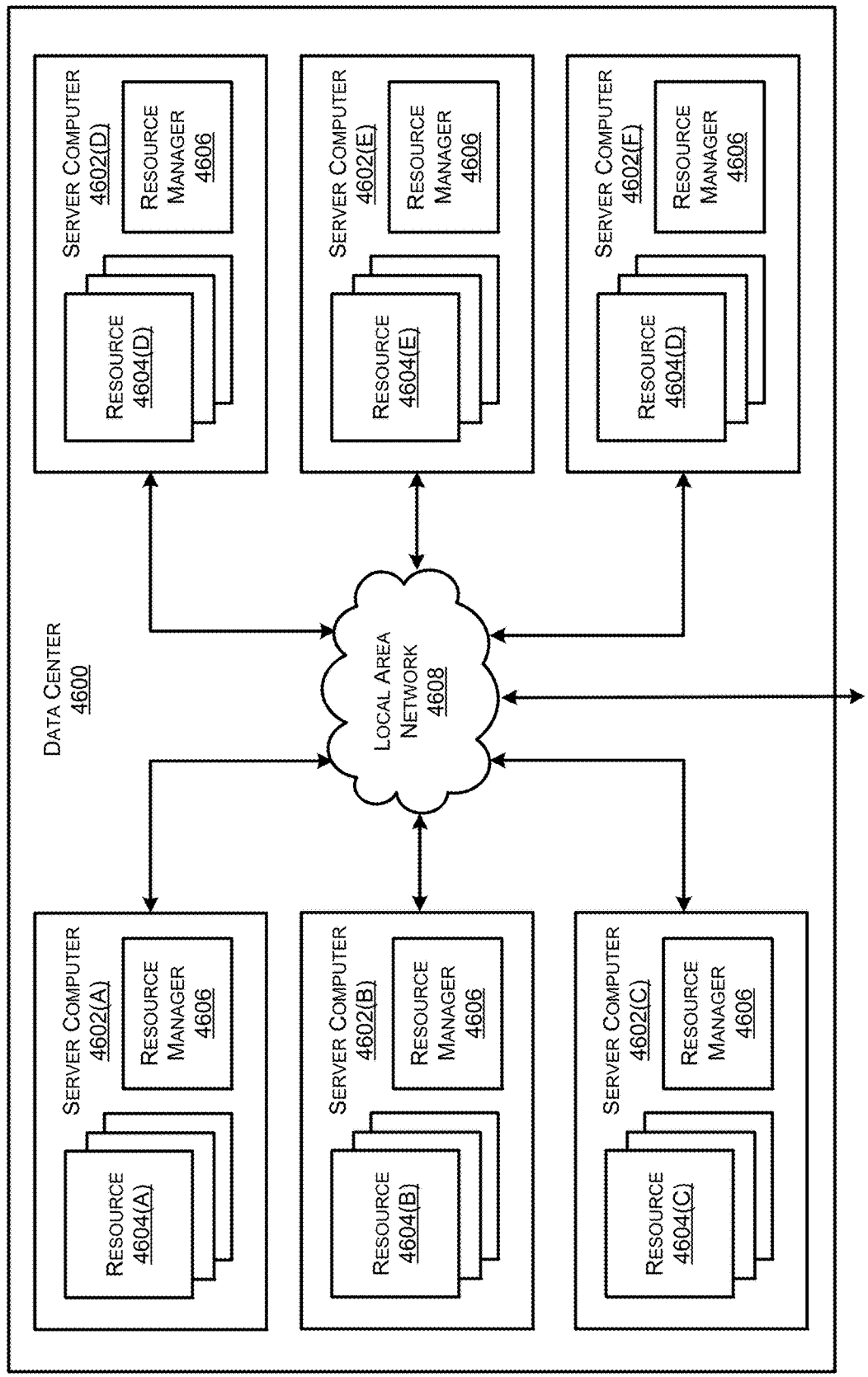
FIG. 46 illustrates a computing system diagram illustrating a configuration for a data center that may be utilized to implement aspects of the technologies disclosed herein.

FIG. 46 illustrates a computing system diagram illustrating a configuration for a data center 4600 that may be utilized to implement aspects of the technologies disclosed herein. The example data center 4600 shown in FIG. 46 includes several server computers 4602A-4602F which might be referred to herein singularly as "a server computer 4602" or in the plural as "the server computers 4602) for providing computing resources. In some examples, the resources and/or server computers 4602 may include, or correspond to, any type of networked device described herein. Although described as servers, the server computers 4602 may comprise any type of networked device, such as servers, switches, routers, hubs, bridges, gateways, modems, repeaters, access points, etc.

The server computers 4602 may be standard tower, rack-mount, or blade server computers configured appropriately for providing computing resources. In some examples, the server computers 4602 may provide computing resources 4604 including data processing resources such as VM instances or hardware computing systems, database clusters, computing clusters, storage clusters, data storage resources, database resources, networking resources, virtual private networks (VPNs), and others. Some of the server computers 4602 may also be configured to execute a resource manager 4606 capable of instantiating and/or managing the computing resources. In the case of VM instances, for example, the resource manager 4606 may be a hypervisor or another type of program configured to enable the execution of multiple VM instances on a single server computer 4602. Server computers 4602 in the data center 4600 may also be configured to provide network services and other types of services.

In the example data center 4600 shown in FIG. 46, an appropriate LAN 4608 is also utilized to interconnect the server computers 4602A-4602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 4600, between each of the server computers 4602A-4602F in each data center 4600, and, potentially, between computing resources in each of the server computers 4602. It may be appreciated that the configuration of the data center 4600 described with reference to FIG. 46 is merely illustrative and that other implementations may be utilized.

In some examples, the server computers 4602 and or the computing resources 4604 may each execute/host one or more tenant containers and/or virtual machines to perform techniques described herein.

In some instances, the data center 4600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 4604 provided by the cloud computing network may include various types of computing resources, such as data processing resources like tenant containers and VM instances, data storage resources, networking resources, data communication resources, network services, VPN instances, and the like.

Each type of computing resource 4604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 4604 not mentioned specifically herein.

The computing resources 4604 provided by a cloud computing network may be enabled in one example by one or more data centers 4600 (which might be referred to herein singularly as "a data center 4600" or in the plural as "the data centers 4600). The data centers 4600 are facilities utilized to house and operate computer systems and associated components. The data centers 4600 typically include redundant and backup power, communications, cooling, and security systems. The data centers 4600 may also be located in geographically disparate locations. One illustrative example for a data center 4600 that may be utilized to implement the technologies disclosed herein is described herein with regard to, for example, FIGS. 1 through 45.

Figure 47:
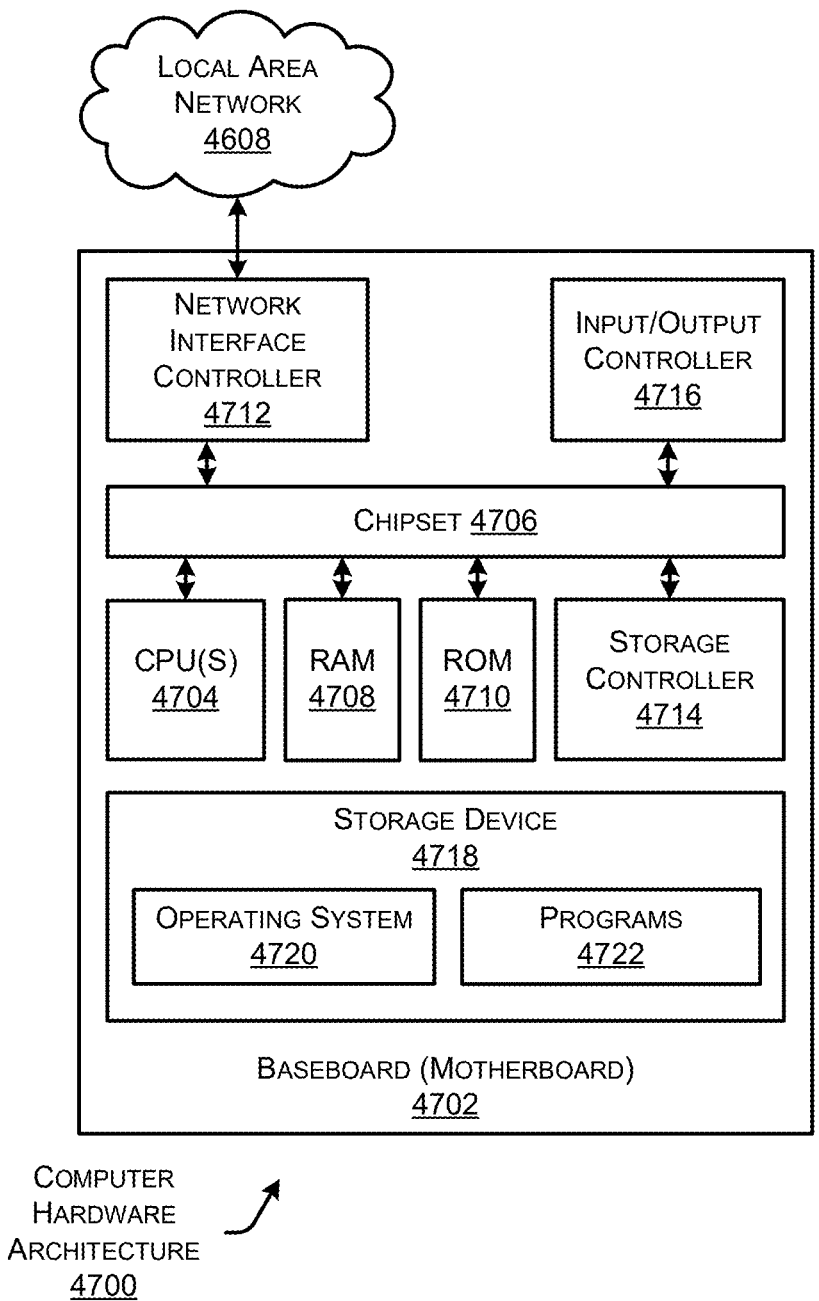
FIG. 47 illustrates a computer architecture diagram showing an example computer hardware architecture for implementing a computing device that may be utilized to implement aspects of the various technologies presented herein.

FIG. 47 illustrates a computer architecture diagram showing an example computer hardware architecture 4700 for implementing a computing device that may be utilized to implement aspects of the various technologies presented herein. The computer hardware architecture 4700 shown in FIG. 47 illustrates the data center 4600, the server computers 4602, client devices, and/or other systems or devices associated with the data center 4600, the server computers 4602, client devices, and/or remote from the data center 4600, the server computers 4602, client devices, a workstation, a desktop computer, a laptop, a tablet, a network appliance, an e-reader, a smartphone, or other computing device, and may be utilized to execute any of the software components described herein. The computer 4700 may, in some examples, correspond to a network device (e.g., data center 4600, the server computers 4602, client devices) described herein, and may comprise networked devices such as servers, switches, routers, hubs, bridges, gateways, modems, repeaters, access points, etc.

The computer 4700 includes a baseboard 4702, or "motherboard," which is a printed circuit board to which a multitude of components or devices may be connected by way of a system bus or other electrical communication paths. In one illustrative configuration, one or more central processing units (CPUs) 4704 operate in conjunction with a chipset 4706. The CPUs 4704 may be standard programmable processors that perform arithmetic and logical operations necessary for the operation of the computer 4700.

The CPUs 4704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 4706 provides an interface between the CPUs 4704 and the remainder of the components and devices on the baseboard 4702. The chipset 4706 may provide an interface to a RAM 4708, used as the main memory in the computer 4700. The chipset 4706 may further provide an interface to a computer-readable storage medium such as a read-only memory (ROM) 4710 or non-volatile RAM (NVRAM) for storing basic routines that help to startup the computer 4700 and to transfer information between the various components and devices. The ROM 4710 or NVRAM may also store other software components necessary for the operation of the computer 4700 in accordance with the configurations described herein.

The computer 4700 may operate in a networked environment using logical connections to remote computing devices and computer systems through a network, such as the data center 4600, the server computers 4602, client devices, among other devices. The chipset 4706 may include functionality for providing network connectivity through a Network Interface Controller (NIC) 4712, such as a gigabit Ethernet adapter. The NIC 4712 is capable of connecting the computer 4700 to other computing devices within the data center 4600, the server computers 4602, client devices and external to the data center 4600, the server computers 4602, client devices. It may be appreciated that multiple NICs 4712 may be present in the computer 4700, connecting the computer to other types of networks and remote computer systems. In some examples, the NIC 4712 may be configured to perform at least some of the techniques described herein, such as packet redirects and/or other techniques described herein.

The computer 4700 may be connected to a storage device 4718 that provides non-volatile storage for the computer. The storage device 4718 may store an operating system 4720, programs 4722 (e.g., any computer-readable and/or computer-executable code described herein), and data, which have been described in greater detail herein. The storage device 4718 may be connected to the computer 4700 through a storage controller 4714 connected to the chipset 4706. The storage device 4718 may consist of one or more physical storage units. The storage controller 4714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 4700 may store data on the storage device 4718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 4718 is characterized as primary or secondary storage, and the like.

For example, the computer 4700 may store information to the storage device 4718 by issuing instructions through the storage controller 4714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 4700 may further read information from the storage device 4718 by detecting the physical states or characteristics of one or more particular locations within the physical storage units.

In addition to the storage device 4718 described above, the computer 4700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 4700. In some examples, the operations performed by the data center 4600, the server computers 4602, client devices, and or any components included therein, may be supported by one or more devices similar to computer 4700. Stated otherwise, some or all of the operations performed by the data center 4600, the server computers 4602, client devices, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 4718 may store an operating system 4720 utilized to control the operation of the computer 4700. According to one example, the operating system 4720 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 4718 may store other system or application programs and data utilized by the computer 4700.

In one example, the storage device 4718 or other computer-readable storage media is encoded with computer-executable instructions which, when loaded into the computer 4700, transform the computer from a general-purpose computing system into a special-purpose computer capable of implementing the examples described herein. These computer-executable instructions transform the computer 4700 by specifying how the CPUs 4704 transition between states, as described above. According to one example, the computer 4700 has access to computer-readable storage media storing computer-executable instructions which, when executed by the computer 4700, perform the various processes described above with regard to FIGS. 1 through 46. The computer 4700 may also include computer-readable storage media having instructions stored thereupon for performing any of the other computer-implemented operations described herein.

The computer 4700 may also include one or more input/output controllers 4716 for receiving and processing input from a number of input devices, such as a keyboard, a mouse, a touchpad, a touch screen, an electronic stylus, or other type of input device. Similarly, an input/output controller 4716 may provide output to a display, such as a computer monitor, a flat-panel display, a digital projector, a printer, or other type of output device. It will be appreciated that the computer 4700 might not include all of the components shown in FIG. 47, may include other components that are not explicitly shown in FIG. 47, or might utilize an architecture completely different than that shown in FIG. 47.

As described herein, the computer 4700 may comprise one or more of the data center 4600, the server computers 4602, client devices, and/or other systems or devices associated with the data center 4600, the server computers 4602, client devices and/or remote from the data center 4600, the server computers 4602, client devices. The computer 4700 may include one or more hardware processor(s) such as the CPUs 4704 configured to execute one or more stored instructions. The CPUs 4704 may comprise one or more cores. Further, the computer 4700 may include one or more network interfaces configured to provide communications between the computer 4700 and other devices, such as the communications described herein as being performed by the data center 4600, the server computers 4602, client devices, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 4722 may comprise any type of programs or processes to perform the techniques described in this disclosure for the data center 4600, the server computers 4602, client devices as described herein. The programs 4722 may enable the devices described herein to perform various operations.

CONCLUSION

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A non-transitory computer-readable medium storing instructions that, when executed, causes a processor to perform operations, comprising:
    displaying a storyboard via a user output device, the storyboard comprising:
        a visualization;
        a plurality of frames, each of the frames comprising text, the plurality of frames comprising a first state and a second state, the first state and the second state affecting a plurality of attributes of a plurality of components of the visualization; and
        a viewport to display at least a portion of a first frame and at least a portion of a second frame, wherein the first state of a first frame exists before the first frame enters view within the viewport, and the second state exists while the first frame is in view within the viewport;
    in response to a determination that the first state and the second state affect a same attribute of a same component of the visualization, performing a handover from the first frame to the second frame based on a percentage of the first frame and the second frame being present in the viewport; and
    changing the visualization from the first state to the second state based on a scroll command from a user input device from a first frame to a second frame of the plurality of frames.

2. The non-transitory computer-readable medium of claim 1, the operations further comprising:
    transmitting a user query, the user query comprising an identification of a position within the storyboard the user query was created;
    presenting the position within the storyboard the user query was created in response to a request to access the user query; and
    transmitting a response to the user query in response to user input.

3. The non-transitory computer-readable medium of claim 1, the operations further comprising:
    storing user query data;
    determining a plurality of variables associated with user interaction with the frames via at least one user input device; and
    determining analytic data based on the variables, the analytic data defining a level of interaction with the frames.

4. The non-transitory computer-readable medium of claim 3, the operations further comprising generating a report based on the analytic data.

5. The non-transitory computer-readable medium of claim 4, wherein the report based on the analytic data includes information defining a level of effort by a student, a level of comprehension of the student, effort trends by the student, a learning objective the student should focus on based on a number of likes associated with the learning objective, a learning objective the student should focus on based on performance of the student as to the learning objective, or combinations thereof.

6. The non-transitory computer-readable medium of claim 4, wherein the report based on the analytic data includes information defining a number of questions presented by a student, a number of annotations to the storyboard by the student, a ranking of learning objectives most misunderstood by the student, a ranking of which questions are most misunderstood by the student, a ranking of which learning objectives are associated with the most questions, a ranking of students that require support based on performance, or combinations thereof.

7. The non-transitory computer-readable medium of claim 4, wherein:
    the analytic data defines interactions with at least one question presented at the frames; and
    the operations further comprise generating the report based on the analytic data comprises a review sheet of the frames specific to a first interactions with the frames from a first client device.

8. The non-transitory computer-readable medium of claim 4, wherein:
    the analytic data defines interactions with at least one question presented at the frames; and
    the operations further comprise generating the report based on the analytic data comprises a ranking of the interactions with the at least one question.

9. A method comprising:
    displaying a storyboard via a user output device, the storyboard comprising:
        visualization;
        a plurality of frames, each of the frames comprising text, the plurality of frames comprising a first state and a second state, the first state and the second state affecting a plurality of attributes of a plurality of components of the visualization; and
        a viewport to display at least a portion of a first frame and at least a portion of a second frame, wherein the first state of a first frame exists before the first frame enters view within the viewport, and the second state exists while the first frame is in view within the viewport;
    in response to a determination that the first state and the second state affect a same attribute of a same component of the visualization, performing a handover from the first frame to the second frame based on a percentage of the first frame and the second frame being present in the viewport; and changing the visualization from the first state to the second state based on a scroll command from a user input device from a first frame to a second frame of the plurality of frames.

10. The method claim 9, further comprising:

transmitting a user query, the user query comprising an identification of a position within the storyboard the user query was created;

presenting the position within the storyboard the user query was created in response to a request to access the user query; and transmitting a response to the user query in response to user input.

11. The method of claim 9, further comprising:

storing user query data;

determining a plurality of variables associated with user interaction with the frames via at least one user input device; and determining analytic data based on the variables, the analytic data defining a level of interaction with the frames.

12. The method of claim 11, further comprising generating a report based on the analytic data.

13. The method of claim 12, wherein the report based on the analytic data includes information defining a level of effort by a student, a level of comprehension of the student, effort trends by the student, a learning objective the student should focus on based on a number of likes associated with the learning objective, a learning objective the student should focus on based on performance of the student as to the learning objective, or combinations thereof.

14. The method of claim 12, wherein the report based on the analytic data includes information defining a number of questions presented by a student, a number of annotations to the storyboard by the student, a ranking of learning objectives most misunderstood by the student, a ranking of which questions are most misunderstood by the student, a ranking of which learning objectives are associated with the most questions, a ranking of students that require support based on performance, or combinations thereof.

15. The method of claim 12, wherein:

the analytic data defines interactions with at least one question presented at the frames; and further comprising generating the report based on the analytic data comprises a review sheet of the frames specific to a first interactions with the frames from a first client device.

16. The method of claim 12, wherein:

the analytic data defines interactions with at least one question presented at the frames; and further comprising generating the report based on the analytic data comprises a ranking of the interactions with the at least one question.

17. A system comprising:

a processor; and a non-transitory computer-readable media storing instructions that, when executed by the processor, causes the processor to perform operations comprising:

displaying a storyboard via a user output device, the storyboard comprising:

a visualization;

a plurality of frames, each of the frames comprising text, the plurality of frames comprising a first state and a second state, the first state and the second state affecting a plurality of attributes of a plurality of components of the visualization; and a viewport to display at least a portion of a first frame and at least a portion of a second frame, wherein the first state of a first frame exists before the first frame enters view within the viewport, and the second state exists while the first frame is in view within the viewport;

in response to a determination that the first state and the second state affect a same attribute of a same component of the visualization, performing a handover from the first frame to the second frame based on a percentage of the first frame and the second frame being present in the viewport; and changing the visualization from the first state to the second state based on a scroll command from a user input device from a first frame to a second frame of the plurality of frames.

18. The system of claim 17, the operations further comprising:

transmitting a user query, the user query comprising an identification of a position within the storyboard the user query was created;

presenting the position within the storyboard the user query was created in response to a request to access the user query; and transmitting a response to the user query in response to user input.

19. The system of claim 17, the operations further comprising:

storing user query data;

determining a plurality of variables associated with user interaction with the frames via at least one user input device; and determining analytic data based on the variables, the analytic data defining a level of interaction with the frames.

20. The non-transitory computer-readable medium of claim 1, wherein the changing of the visualization within the frame from the first state to the second state comprises changing of the visualization within the frame from the first state to the second state at a breakpoint.

\* \* \* \* \*